US012779377B2

(12) United States Patent
Nodomi et al.

(10) Patent No.: US 12,779,377 B2
(45) Date of Patent: Nov. 3, 2026

(54) SUCTION STRAINER

(71) Applicant: YAMASHIN-FILTER CORP., Kanagawa (JP)

(72) Inventors: Youichi Nodomi, Kanagawa (JP); Nobuyuki Kitajima, Kanagawa (JP); Hideo Nakaoka, Kanagawa (JP)

(73) Assignee: YAMASHIN-FILTER CORP., Kanagawa (JP)

(*) Notice: Subject to any disclaimer, the term of this patent is extended or adjusted under 35 U.S.C. 154(b) by 313 days.

(21) Appl. No.: 18/745,527

(22) Filed: Jun. 17, 2024

(65) Prior Publication Data

US 2024/0335774 A1 Oct. 10, 2024

Related U.S. Application Data

(63) Continuation of application No. PCT/JP2022/047199, filed on Dec. 21, 2022.

(30) Foreign Application Priority Data

Dec. 23, 2021 (JP) ................................ 2021-209887

(51) Int. Cl.
*B01D 29/07* (2006.01)
*B01D 24/00* (2006.01)
(Continued)

(52) U.S. Cl.
CPC ......... *B01D 35/0273* (2013.01); *B01D 24/00* (2013.01); *B01D 29/00* (2013.01);
(Continued)

(58) Field of Classification Search
CPC ........ B01D 24/00; B01D 29/00; B01D 29/07; B01D 29/11; B01D 29/114; B01D 29/15;
(Continued)

(56) References Cited

U.S. PATENT DOCUMENTS

2018/0104628 A1 4/2018 Taku et al.
2022/0145912 A1 5/2022 Hashimoto et al.

FOREIGN PATENT DOCUMENTS

JP S51-8176 Y1 3/1976
JP 2003-299917 A 10/2003
(Continued)

OTHER PUBLICATIONS

International Search Report issued in PCT/JP2022/047199 mailed on Feb. 21, 2023 with English Translation (5 pages).
(Continued)

*Primary Examiner* — John Kim
(74) *Attorney, Agent, or Firm* — Nakanishi IP Associates, LLC

(57) ABSTRACT

A suction strainer provided in a tank in which oil is stored includes a filtration section having a tubular shape formed by bending a thin plate into a pleated shape, a first end member and a second end member covering respective both ends of the filtration section, and a float provided on the first end member. The filtration section is provided along a horizontal direction. A tubular portion has an air vent hole having one end opening to a first hole and the other end opening to the inside of the tank. The float is provided to be movable between a position where the air vent hole is closed and a position where the air vent hole is opened.

8 Claims, 16 Drawing Sheets

(A)

(B)

(51) Int. Cl.

| | |
|---|---|
| ***B01D 29/00*** | (2006.01) |
| ***B01D 29/11*** | (2006.01) |
| ***B01D 29/15*** | (2006.01) |
| ***B01D 29/21*** | (2006.01) |
| ***B01D 29/33*** | (2006.01) |
| ***B01D 29/58*** | (2006.01) |
| ***B01D 35/02*** | (2006.01) |
| ***B01D 35/027*** | (2006.01) |
| ***B01D 36/00*** | (2006.01) |

(52) U.S. Cl.
CPC .............. *B01D 29/07* (2013.01); *B01D 29/11* (2013.01); *B01D 29/114* (2013.01); *B01D 29/15* (2013.01); *B01D 29/21* (2013.01); *B01D 29/33* (2013.01); *B01D 29/333* (2013.01); *B01D 29/58* (2013.01); *B01D 35/02* (2013.01); *B01D 36/001* (2013.01); *B01D 2201/208* (2013.01); *B01D 2201/291* (2013.01); *B01D 2201/306* (2013.01); *B01D 2201/34* (2013.01); *B01D 2201/64* (2013.01)

(58) Field of Classification Search
CPC ...... B01D 29/21; B01D 29/33; B01D 29/333; B01D 29/58; B01D 35/02; B01D 35/0273; B01D 36/001; B01D 2201/208; B01D 2201/291; B01D 2201/306; B01D 2201/34; B01D 2201/64
See application file for complete search history.

(56) References Cited

FOREIGN PATENT DOCUMENTS

| | | | |
|---|---|---|---|
| JP | 2020-22924 | A | 2/2020 |
| WO | 2016/204117 | A1 | 12/2016 |
| WO | 2021/020470 | A1 | 2/2021 |

OTHER PUBLICATIONS

Written Opinion of International Searching Authority issued in PCT/JP2022/047199mailed on Feb. 21, 2023 with English Translation (5 pages).

(A)

(B)

(A)

(B)

(A)

(B)

(A)

(B)

SUCTION STRAINER

CROSS-REFERENCE TO RELATED APPLICATIONS

This application is a continuation application of International Patent Application No. PCT/JP2022/047199 filed on Dec. 21, 2022, which claims priority to Japanese Patent Application No. 2021-209887 filed on Dec. 23, 2021, the entire contents of which are incorporated by reference.

TECHNICAL FIELD

The present invention relates to a suction strainer.

BACKGROUND ART

Patent Document 1 discloses a suction filter in which a cover is provided on an upper end surface of a tubular first filtration section so as to cover an entire upper side of the first filtration section, and a valve is provided at a lower side of the cover and in a hollow portion of the first filtration section. The valve is switched between a closed state in which a first valve body movable along a rod-shaped member closes a hole of the cover and an open state in which the first valve body does not close the hole.

CITATION LIST

Patent Literature

Patent Document 1: JP 2020-22924 A

However, the invention described in Patent Document 1 is applicable only to a case where an axis of the tubular filtration section runs along a vertical direction and the cover is provided along a horizontal direction, and is not applicable to a case where the tubular filtration section is provided along the horizontal direction.

SUMMARY OF INVENTION

One or more embodiments of the present invention provide a suction strainer that can discharge air bubbles accumulated inside when a filtration section is provided along a horizontal direction.

A suction strainer according to one or more embodiments of the present invention is a suction strainer provided in a tank in which oil is stored. The suction strainer includes a filtration section having a tubular shape, a first end member and a second end member, and a float. The filtration section is formed by bending a thin plate into a pleated shape. The first end member and the second end member cover respective both ends of the filtration section. The float is provided on the first end member. The filtration section is provided along a horizontal direction. The first end member includes a plate-shaped first mounting portion provided on a side surface of the tank, a second mounting portion in which the filtration section is provided, a tubular portion having a tubular shape provided between the first mounting portion and the second mounting portion, and a first hole that communicates a hollow portion of the filtration section with an outside of the tank. The tubular portion, the second mounting portion, the filtration section, and the second end member are provided inside the tank. The tubular portion has an air vent hole having one end opening to the first hole and the other end opening to the inside of the tank. The float is provided to be movable between a position where the air vent hole is closed and a position where the air vent hole is opened.

According to the suction strainer according to one or more embodiments of the present invention, the first end member covering the one ends of the filtration section having a tubular shape provided along the horizontal direction has the air vent hole having one end opening to the first hole communicating the hollow portion of the filtration section with the outside of the tank and the other end opening to the inside of the tank. The first end member includes the float provided to be movable between the position where the air vent hole is closed and the position where the air vent hole is opened. As a result, it is possible to discharge air bubbles accumulated inside the suction strainer in which the filtration section is provided along the horizontal direction. However, the air vent hole is preferably provided at an upper end of the tubular portion in a vertical direction.

The first end member may have a second hole that couples the hollow portion of the filtration section to the air vent hole. Accordingly, it is possible to efficiently discharge the air bubbles accumulated in the hollow portion of the filtration section.

The filtration section may include a first filtration section having a tubular shape and a second filtration section having a tubular shape provided inside the first filtration section. The first end member may have a second hole that couples a hollow portion of the second filtration section to the air vent hole. Accordingly, it is possible to efficiently discharge the air bubbles accumulated in the hollow portion of the second filtration section.

The filtration section may include a first filtration section having a tubular shape and a second filtration section having a tubular shape provided inside the first filtration section. The first end member may include a third hole that couples a space between the first filtration section and the second filtration section to the air vent hole. As a result, air bubbles can be efficiently discharged from the suction strainer by accumulating the air bubbles between the first filtration section and the second filtration section and discharging the air bubbles to the air vent hole through the third hole.

The tubular portion may have an air vent recess that does not open to the first hole and have one end opening to the inside of the tank. The first end member may include a fourth hole that couples a space between the first filtration section and the second filtration section to the air vent recess. As a result, air bubbles can be efficiently discharged from the suction strainer by accumulating the air bubbles between the first filtration section and the second filtration section and discharging the air bubbles to the air vent recess through the fourth hole.

In a state where the float closes the air vent hole, the float and an upper end of the filtration section may be located at substantially a same height, or the float may be higher than the upper end of the filtration section. As a result, air accumulated inside can be effectively discharged to outside the suction strainer.

The first hole may include: a through-hole having a first end as one end opening to an end of the first mounting portion located on the tank side, and a second end opposite side of the first end, the second end opening to an end of the first mounting portion on the filtration section side; and a recessed portion provided on an upper side of the through-hole in a vertical direction. The through-hole and the recessed portion may be integrated. A third end as one end of the recessed portion may be open to the air vent hole, and a fourth end opposite side of the third end may be open to an end of the first mounting portion located outside the tank. Thus, residual air accumulated in the recessed portion can be discharged from the air vent hole to the outside of the suction strainer.

The recessed portion may have an arcuate shape drawing an arc that is convex to the upper side in the vertical direction in a surface orthogonal to a center axis of the through-hole. Accordingly, a bottom surface (upper end in the vertical direction) of the recessed portion is narrowed, and the residual air accumulated in the recessed portion easily grows into large air bubbles. As a result, it is possible to easily remove the residual air from the air vent hole.

According to one or more embodiments of the present invention, it is possible to discharge air bubbles accumulated inside the suction strainer in which the filtration section is provided along the horizontal direction.

DESCRIPTION OF EMBODIMENTS

Hereinafter, embodiments of the present invention will be described in detail with reference to the drawings.

First Embodiment

Figure 1:
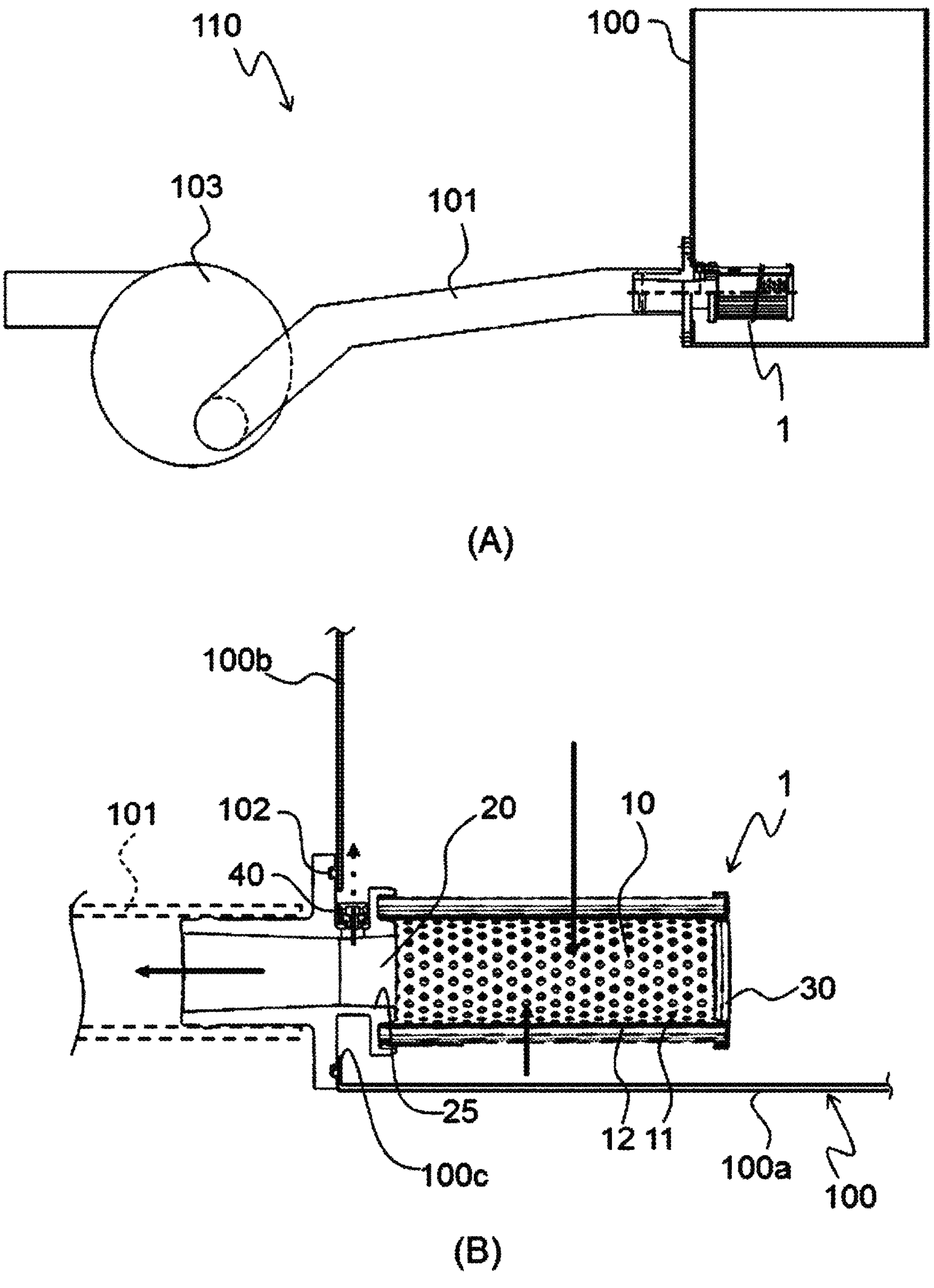
FIG. 1 shows (A) a diagram illustrating an outline of a hydraulic circuit 110 including a suction strainer 1 and according to an embodiment of the present invention, and (B) a diagram illustrating an outline of a tank 100 inside of which the suction strainer 1 is provided.

FIG. 1(A) is a diagram illustrating an outline of a hydraulic circuit 110 including a suction strainer 1 according to an embodiment of the present invention, and FIG. 1(B) is a diagram illustrating an outline of the suction strainer 1 and a tank 100. In FIG. 1, hatching indicating a cross section is omitted.

The tank 100 is installed in a work machine that is not illustrated (for example, a hydraulic device) and is a tank provided in the hydraulic circuit 110 of hydraulic oil supplied to the hydraulic device and stores the hydraulic oil. The tank 100 is not limited to be provided in the hydraulic circuit, and the liquid stored in the tank 100 is not limited to the hydraulic oil.

The tank 100 is, for example, formed in a box-like shape and hollow inside. The tank 100 mainly internally includes the suction strainer 1 and a return filter (not illustrated).

In the hydraulic circuit 110, the hydraulic oil passes through the hydraulic device (not illustrated) and is introduced into the tank 100. An inflow port (not illustrated) that causes the hydraulic oil to flow into the tank 100 is formed in the tank 100. The hydraulic oil that has flowed from the inflow port is introduced into the return filter. The hydraulic oil is filtered by the return filter and is stored in the tank 100.

An outflow port 100*c* that causes the hydraulic oil in the tank 100 to flow out to a hydraulic pump (not illustrated) is formed in a vicinity of a lower end portion of a side surface 100*b* of the tank 100 (a position of a side surface of the tank 100 near a bottom surface 100*a* in the present embodiment). The suction strainer 1 is provided on the outflow port 100*c*. The suction strainer 1 has a tubular shape and is provided along a horizontal direction. Here, "along a horizontal direction" is not limited to a case of strictly along the horizontal direction, but includes a case of being inclined by several degrees with respect to the horizontal direction.

An elastic member 102, such as an O-ring, is provided between the suction strainer 1 and the tank 100. Therefore, the hydraulic oil does not leak from between the suction strainer 1 and the tank 100.

A suction pipe 101 that leads to a suction port of a hydraulic pump 103 from outside the tank 100 is provided in the suction strainer 1. The hydraulic oil stored in the tank 100 is suctioned into the hydraulic pump 103, flows out to the suction pipe 101 through the suction strainer 1, and is supplied again to the hydraulic device.

The outflow port 100*c* and the suction strainer 1 only need to be provided on the side surface 100*b* of the tank 100, and the positions of the outflow port 100*c* and the suction strainer 1 are not limited to the positions illustrated in FIG. 1.

Figure 2:
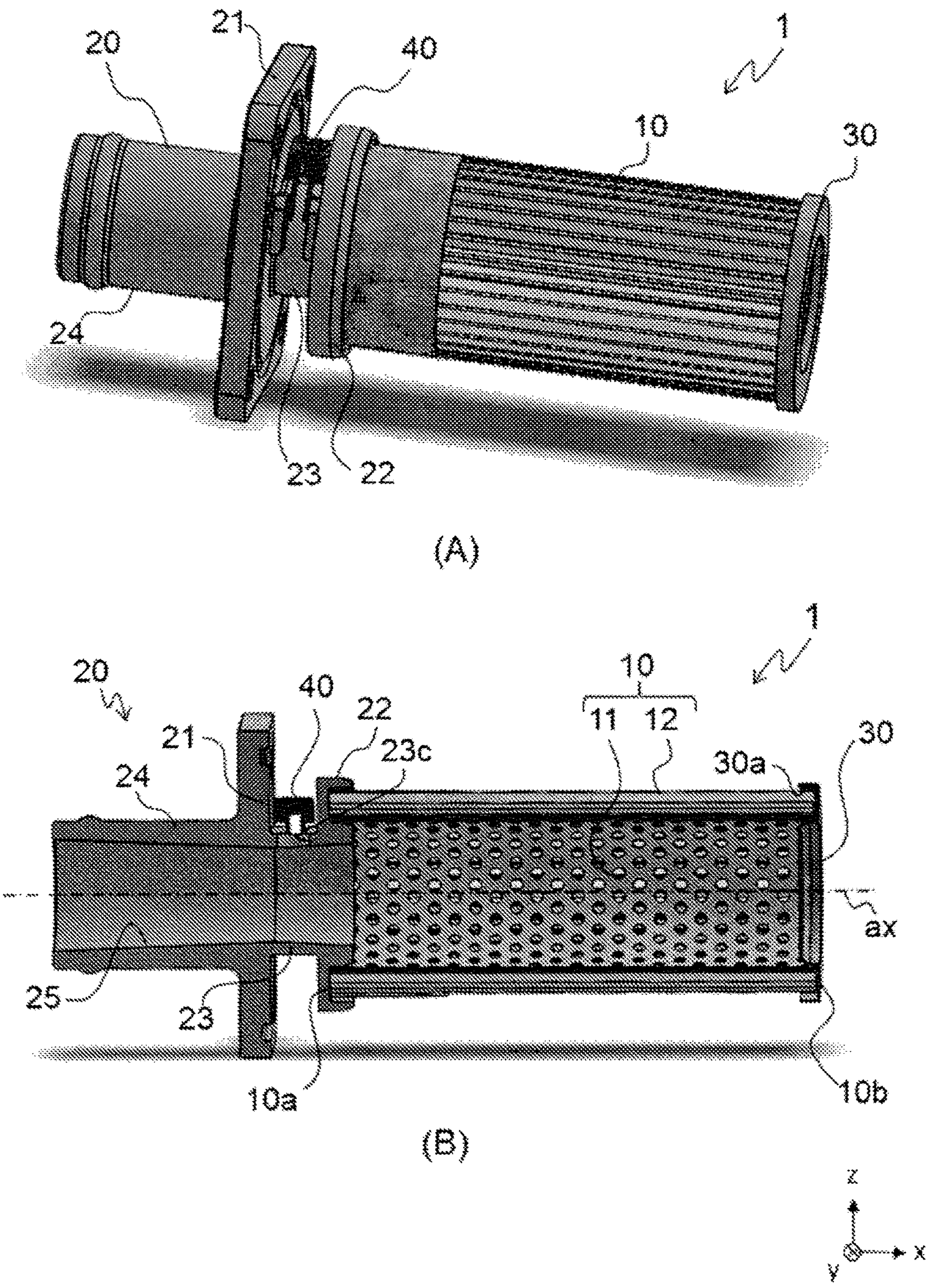
FIG. 2 includes diagrams illustrating an outline of the suction strainer 1. (A) is a perspective view, and (B) is a cross-sectional view.

FIG. 2 includes diagrams illustrating an outline of the suction strainer 1, FIG. 2(A) is a perspective view, and FIG. 2(B) is a cross-sectional view. Hereinafter, an extending direction of the suction strainer 1 (an extending direction of a center axis ax of the suction strainer 1) is referred to as an x direction, and a vertical direction is referred to as a z direction (a vertically upward direction is a +z direction). A direction orthogonal to the x direction and the z direction is defined as a y direction.

The suction strainer 1 mainly includes a filtration section 10, a plate 20, and a float 40.

The filtration section 10 mainly includes an inner tube 11 and a pleated filtration member 12. The inner tube 11 is a member having a tubular shape (here, a cylindrical shape) having openings on both ends. The inner tube 11 is formed using a material (stainless steel, for example) having high corrosion resistance. The inner tube 11 has holes through which the hydraulic oil passes in a substantially its entire region. A diameter of the inner tube 11 is smaller than a diameter of the pleated filtration member 12, and the inner tube 11 is provided inside the pleated filtration member 12.

The pleated filtration member 12 is a member filtering the hydraulic oil and having a tubular shape (here, a cylindrical shape). A height of the pleated filtration member 12 is substantially the same as a height of the inner tube 11. The pleated filtration member 12 is formed by pleating a sheet-like thin plate having holes formed in substantially the entire region thereof, and connecting both ends of the pleated thin plate so as to round to form a cylindrical shape. As a result, the pleated filtration member 12 is formed into a substantially cylindrical pleated shape. Note that while the pleated filtration member 12 is formed of a wire mesh made of a fine metal (stainless steel, for example) and formed of thin wires woven into a mesh in the present embodiment, a filter paper using, for example, a synthetic resin and a paper may be used.

The plate 20 (equivalent to a first end member of the present invention) is provided at one end 10*a* of the filtration section 10 (the inner tube 11 and the pleated filtration member 12), and a plate 30 (equivalent to a second end member of the present invention) is provided at the other end 10*b*. The plate 20 and the plate 30 are formed using a material having high corrosion resistance (resin or metal). The plate 30 has a recessed portion 30*a* into which the inner tube 11 and the pleated filtration member 12 are inserted, and when the recessed portion 30*a* is provided in the filtration section 10, the plate 30 covers the end (opening) of the filtration section 10.

The plate 20 mainly includes a plate-shaped mounting portion 21 provided in the tank 100 (see FIG. 1), a mounting portion 22 to which the filtration section 10 is mounted, a tubular portion 23 having a tubular shape provided between the mounting portion 21 and the mounting portion 22, a mounting tube 24 to which the suction pipe 101 (see FIG. 1) is provided, and a hole 25 (equivalent to a first hole of the present invention) passing through the mounting portion 21, the mounting portion 22, the tubular portion 23, and the mounting tube 24.

The mounting tube 24, the mounting portion 21, the tubular portion 23, and the mounting portion 22 are arranged in order along the x direction when the mounting portion 21 is provided in the tank 100. The hole 25 causes a hollow portion of the filtration section 10 to communicate with the outside of the tank 100 (here, the suction pipe 101). In the present embodiment, the hole 25 has an inverted tapered shape in which respective inner diameters at both ends widen, but the shape of the hole 25 is not limited thereto. Although an axis of the hole 25 matches the axis ax in the present embodiment, the axis of the hole 25 may be displaced from the axis ax. In addition, in the present embodiment, the hole 25 runs along the horizontal direction (here, the x direction) when the mounting portion 21 is provided in the tank 100, but may be inclined with respect to the horizontal direction.

The mounting portion 21 has the plate shape and is provided outside the tank 100. The tubular portion 23 and the mounting tube 24 are provided in the mounting portion 21. When the mounting portion 21 is provided in the tank 100, the mounting portion 22 and the tubular portion 23 are located inside the tank 100, and the mounting tube 24 is located outside the tank 100. The mounting portion 22 has a plate shape and is provided so as to cover the end 10*a*. By providing the filtration section 10 in the mounting portion 22, the filtration section 10 is extended along the horizontal direction. The tubular portion 23 has a smaller diameter than that of the mounting portion 22.

Figure 3:
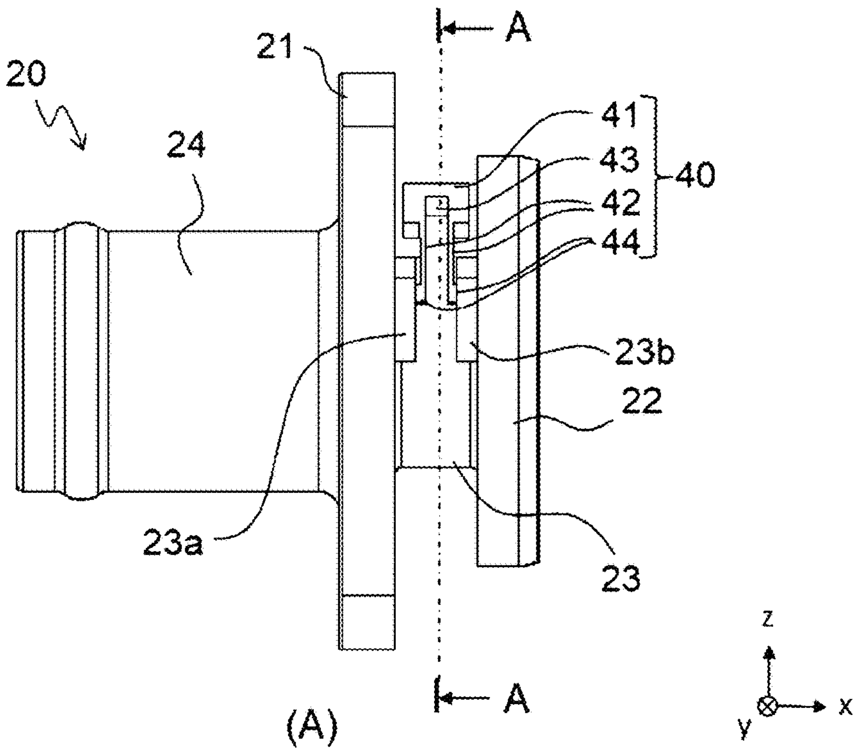
FIG. 3 includes diagrams illustrating an outline of a plate 20 and a float 40. (A) is a side view, and (B) is a cross-sectional view taken along A-A of (A).
Figure 3:
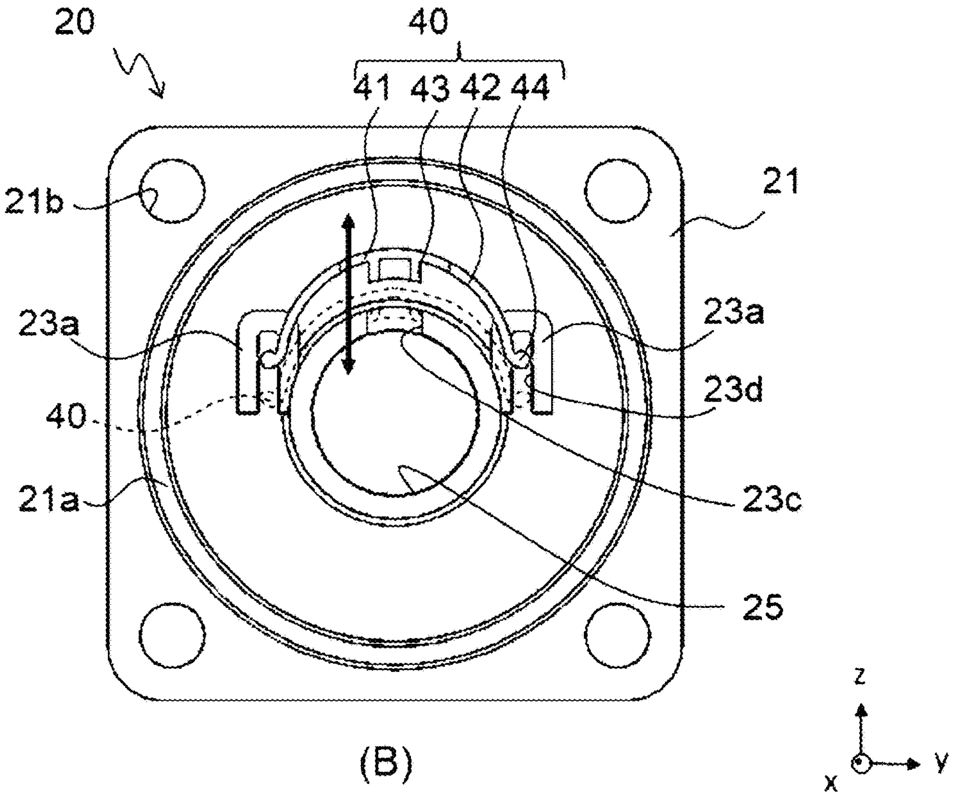
Figure 4:
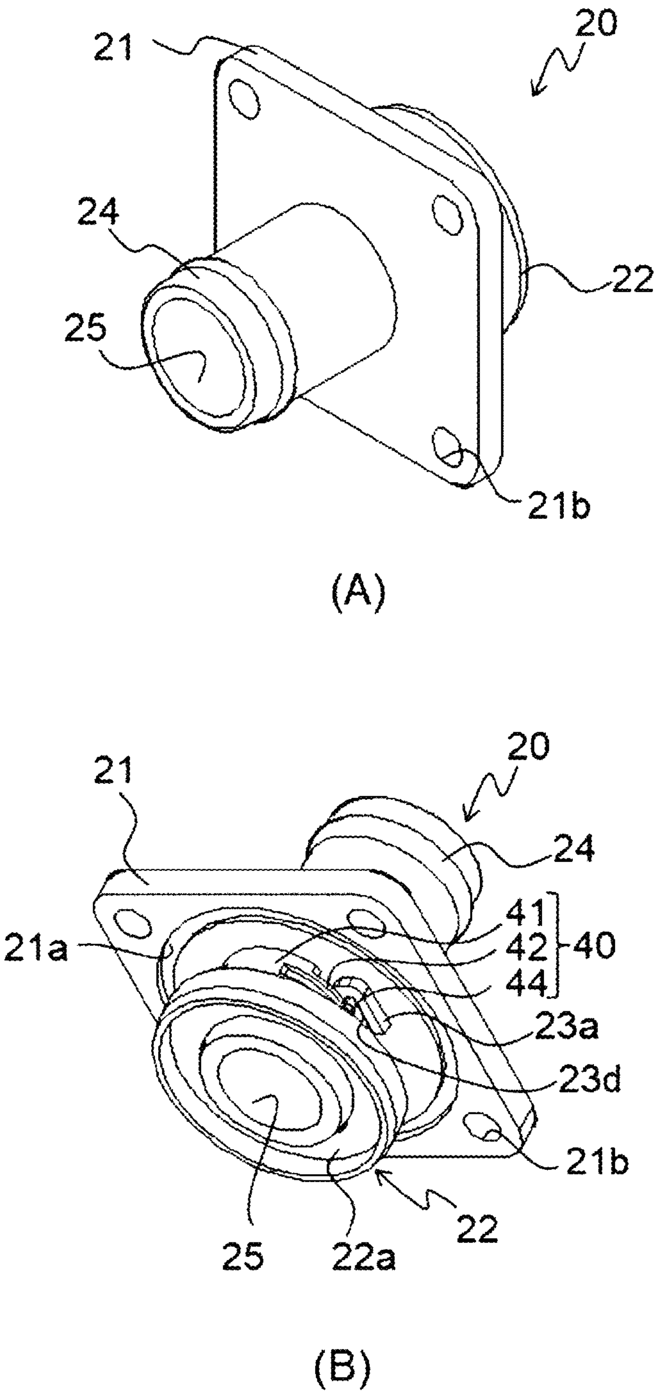
FIG. 4 shows perspective views illustrating an outline of the plate 20 and the float 40.
Figure 5:
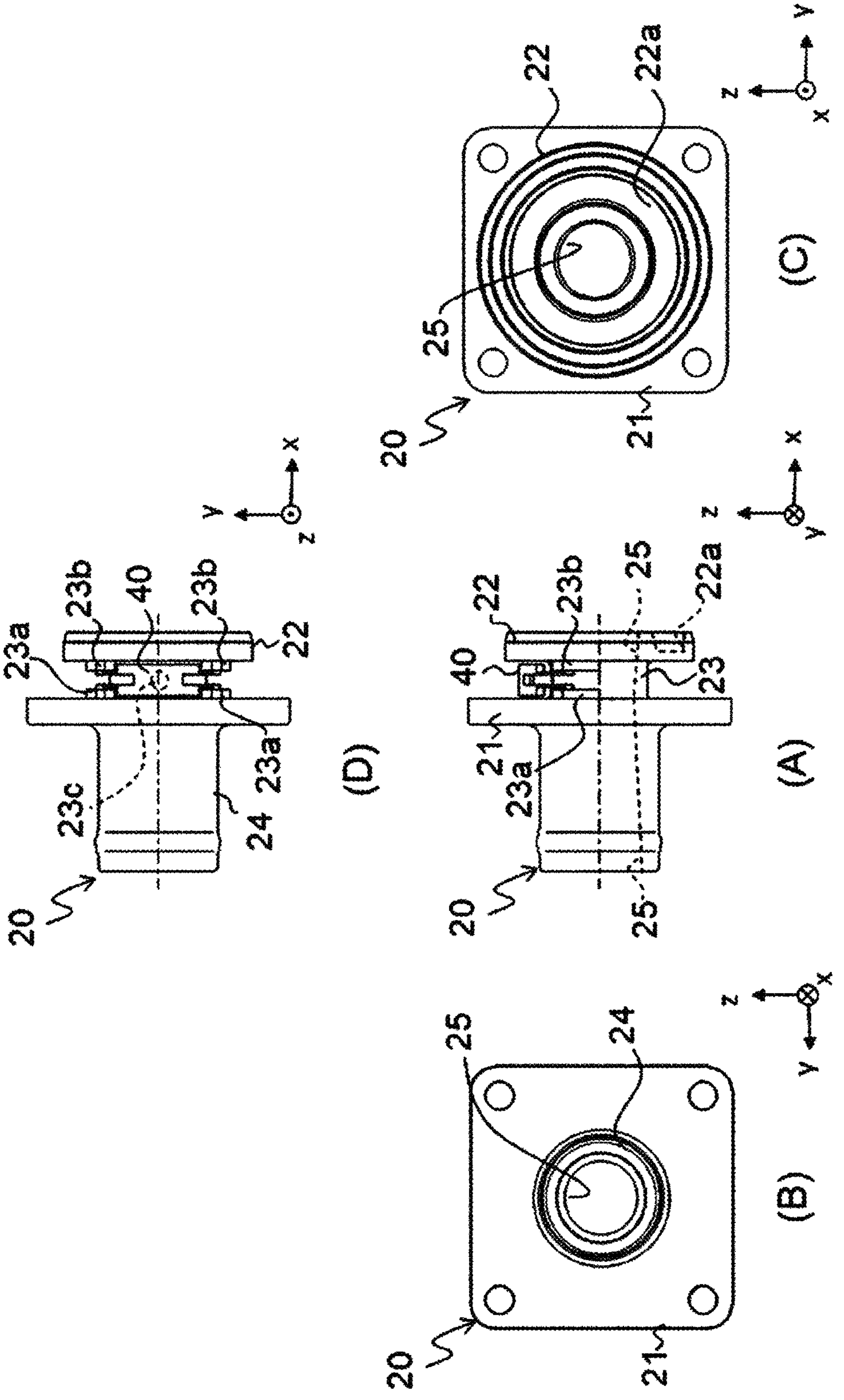
FIG. 5 includes diagrams illustrating an outline of the plate 20 and the float 40. (A) is a front view, (B) is a left side view, (C) is a right side view, and (D) is a plan view.

FIG. 3 includes diagrams illustrating an outline of the plate 20 and the float 40, FIG. 3(A) is a side view, and FIG. 3(B) is a cross-sectional view taken along A-A of FIG. 3(A). FIGS. 4(A) and 4(B) are perspective views illustrating an outline of the plate 20 and the float 40. FIG. 5 includes diagrams illustrating an outline of the plate 20 and the float 40, FIG. 5(A) is a front view, FIG. 5(B) is a left side view, FIG. 5(C) is a right side view, and FIG. 5(D) is a plan view. Note that the front view and a back view are symmetrical.

The mounting portion 21 includes a recessed portion 21*a* into which the elastic member 102 is inserted and holes 21*b* into which bolts or the like for mounting the mounting portion 21 to the tank 100 are inserted. Note that the position and size of the hole 21*b* are not limited thereto. For example, to make the vertical direction easy to understand, positions of the upper two holes 21*b* in the y direction may be different from positions of the lower two holes 21*b* in the y direction. In addition, characters, such as "UP," may be displayed on a surface of the mounting portion 21 by casting or the like to make the vertical direction easy to understand.

The mounting portion 22 has a recessed portion 22*a* into which the end 10*a* (see FIG. 2) is inserted. The hole 25 is open in an end surface of the mounting portion 22. The hole 25 is open to the mounting tube 24.

The plate 20 includes each of two projections 23*a* and 23*b* adjacent to an outer peripheral surface of the tubular portion 23. In the present embodiment, a part of the projections 23*a* and 23*b* abuts on the outer peripheral surface of the tubular portion 23, but a part of each of the projections 23*a* and 23*b* need not abut on the outer peripheral surface of the tubular portion 23. Whether a part of the projections 23*a* and 23*b* abut on the outer peripheral surface of the tubular portion 23 or not, the fact that the projections 23*a* and 23*b* are adjacent to the outer peripheral surface of the tubular portion 23 does not change.

The pair of projections 23*a* are provided on the mounting portion 21, and the pair of projections 23*b* are provided on the mounting portion 22. The projection 23*a* and the projection 23*b* face one another. Since the projection 23*a* and the projection 23*b* have the same shape, hereinafter, the projections 23*a* and 23*b* will be described using the projection 23*a*.

The pair of projections 23*a* are provided so as to face one another with the tubular portion 23 interposed therebetween. Positions of the two projections 23*a* in the z direction are the same. The projection 23*a* has substantially a U-shape or substantially a lateral U-shape and has a groove 23*d* therein. The groove 23*d* runs along the z direction, and an upper end thereof is covered with the projection 23*a*. A projection 44 (described in detail later) of the float 40 is inserted into the groove 23*d*, and the projection 44 moves along the groove 23*d*, whereby the float 40 moves in the z direction.

The tubular portion 23 has an air vent hole 23*c*. The tubular portion 23 has an axis running along the horizontal direction, and the air vent hole 23*c* is provided at an upper end of the tubular portion 23 in the vertical direction. One end of the air vent hole 23*c* opens to the hole 25, and the other end opens to the inside of the tank 100. Therefore, air accumulated in the vicinity of the upper end of the hole 25 can be discharged to the outside of the suction strainer 1 through the air vent hole 23*c*.

The float 40 is provided on the projections 23*a* and 23*b*. The float 40 is substantially a U-shape when viewed along the axis ax (the axis of the tubular portion 23).

Figure 6:
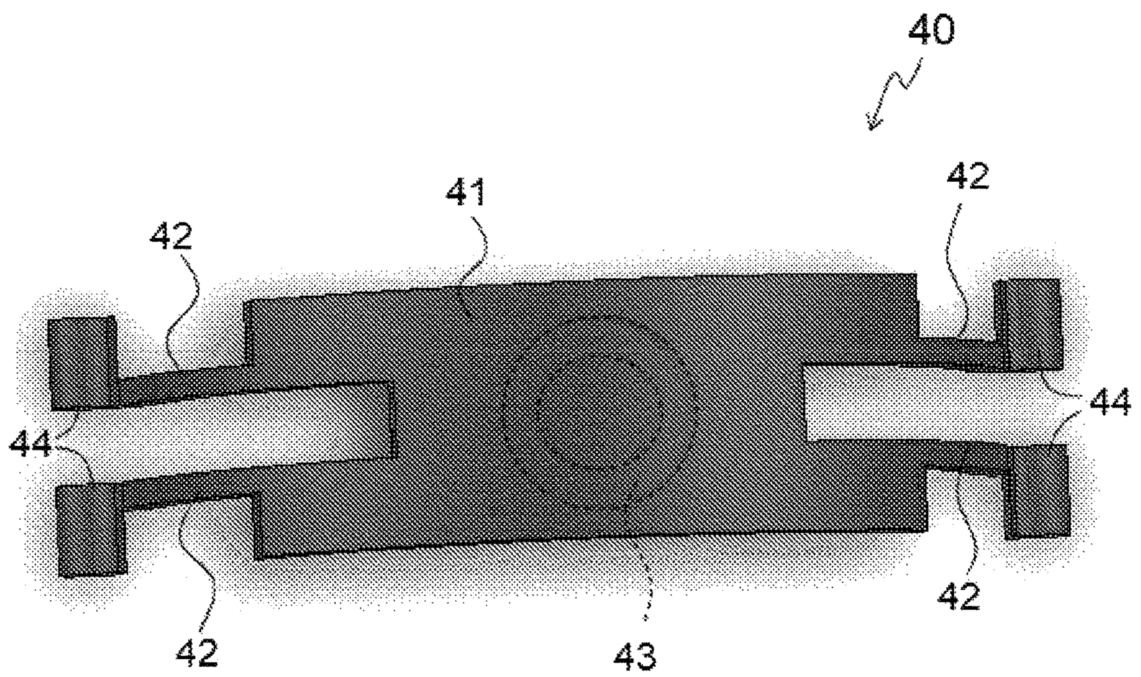
FIG. 6 is a diagram illustrating an outline of the float 40.

FIG. 6 is a diagram illustrating an outline of the float 40. The float 40 includes a body portion 41, leg portions 42, an insertion portion 43, and projections 44. The rod-shaped insertion portion 43 is provided on a surface at the −z side of the body portion 41. When the body portion 41 covers the air vent hole 23*c*, the insertion portion 43 is inserted into the air vent hole 23*c*. The two leg portions 42 are provided at each of both ends of the body portion 41. The projection 44 is provided at each distal end of the leg portion 42.

The description will now return to FIS. 3 to 5. The projections 44 are provided on the projections 23*a* and 23*b* and slide along the groove 23*d*. As a result, as illustrated in FIG. 3(B), the float 40 is movable in the vertical direction (z direction) between a position where the body portion 41 closes the air vent hole 23*c* (see the dotted line in FIG. 3(B)) and a position where the air vent hole 23*c* is opened (see the solid line in FIG. 3(B)).

Next, the functionality of the suction strainer 1 thus configured will be described. As illustrated in FIG. 1, the suction strainer 1 is horizontally mounted to the tank 100, and hydraulic oil is stored in the tank 100.

Since the plate 20 is provided on the end 10*a* of the filtration section 10 and the plate 30 is provided on the end 10*b*, when the hydraulic oil stored in the tank 100 is suctioned by the hydraulic pump (not illustrated) as indicated by the solid arrow in FIG. 1, the hydraulic oil is suctioned from the outside of the filtration section 10 into the filtration section 10 through the pleated filtration member 12 and the inner tube 11 and flows out to the suction pipe 101 through the hole 25.

Further, since the hydraulic oil is suctioned by the hydraulic pump, the float 40 is pulled in the −z direction together with the hydraulic oil, the float 40 abuts on the tubular portion 23, and the body portion 41 closes the air vent hole 23*c*. As a result, the hydraulic oil does not flow into the suction strainer 1 from other than the filtration section 10.

In a case where the hydraulic oil is suctioned into the filtration section 10, the air bubbles contained in the hydraulic oil are also suctioned into the filtration section 10 along with the hydraulic oil. The air bubbles hang together inside the filtration section 10 and the hole 25 and grow into large air bubbles. The grown air bubbles push up the float 40 in the +z direction to open the air vent hole 23*c*. As a result, as indicated by the two dot chain line arrow in FIG. 1, the air bubbles are discharged from the air vent hole 23*c* to the outside of the suction strainer 1.

According to the present embodiment, when the suction strainer 1 is provided along the horizontal direction, the air bubbles accumulated inside the suction strainer 1 can be discharged from the suction strainer 1 through the air vent hole 23*c*. As a result, it is possible to prevent air bubbles from accumulating in the suction pipe 101 and a failure caused by the pump suctioning air. In addition, damage of a component and the like resulting from the air bubbles bursting inside the hydraulic circuit or the like, which causes a temperature and a pressure of the hydraulic oil to temporarily increase to a significant degree, can be prevented.

Further, according to the present embodiment, since the float 40 is provided on the outside of the tubular portion 23, the flow of the hydraulic oil flowing through the hole 25 is not hindered.

Figure 7:
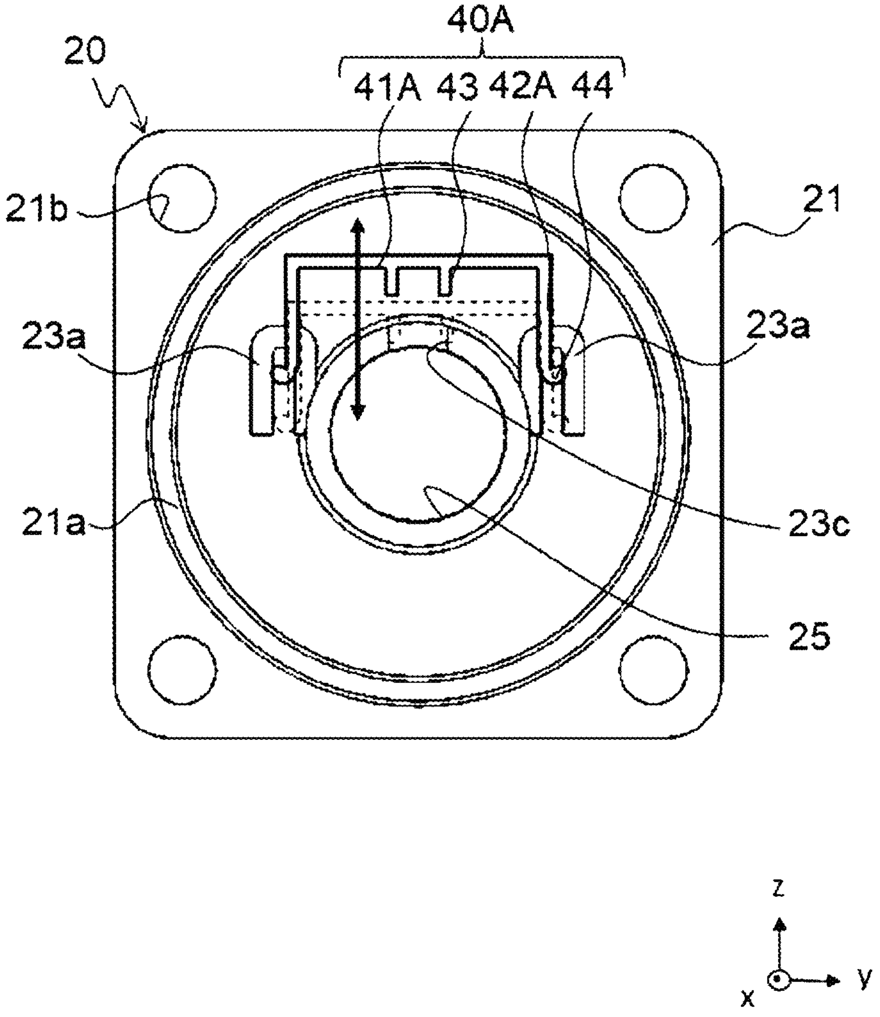
FIG. 7 is a diagram illustrating an outline of the plate 20 and a float 40A according to a modification.

Although the float 40 has a substantially U-shape in the present embodiment, the shape of the float is not limited thereto. FIG. 7 is a diagram illustrating an outline of the plate 20 and a float 40A according to a modification. In FIG. 7, hatching indicating a cross section is omitted.

The float 40A has a substantially lateral U-shape, and mainly includes a plate-shaped body portion 41A, leg portions 42A, the insertion portion 43, and projections 44. The rod-shaped insertion portion 43 is provided on a surface at the −z side of the body portion 41A. When the body portion 41A covers the air vent hole 23*c*, the insertion portion 43 is inserted into the air vent hole 23*c*. The two leg portions 42A are provided at each of both ends of the body portion 41A. The projection 44 is provided at each distal end of the leg portion 42A. The projections 44 are provided on the projections 23*a* and 23*b* and slide along the groove 23*d*. As a result, the float 40A is movable in the z direction between a position where the body portion 41A closes the air vent hole 23*c* (see the dotted line in FIG. 7) and a position where the air vent hole 23*c* is opened (see the solid line in FIG. 7).

Second Embodiment

In the first embodiment of the present invention, the diameter of the tubular portion 23 is smaller than the diameter of the mounting portion 22, and the float 40 is located at a position lower than the upper end of the pleated filtration member 12, but the position of the float is not limited thereto.

In a second embodiment of the present invention, a height of the upper end of the float is substantially the same configuration as a height of the upper end of the pleated filtration member. Below, description is given of a suction strainer 2 according to the second embodiment. Note that the same components as those in the first embodiment are denoted by the same reference numerals, and descriptions thereof will be omitted.

Figure 8:
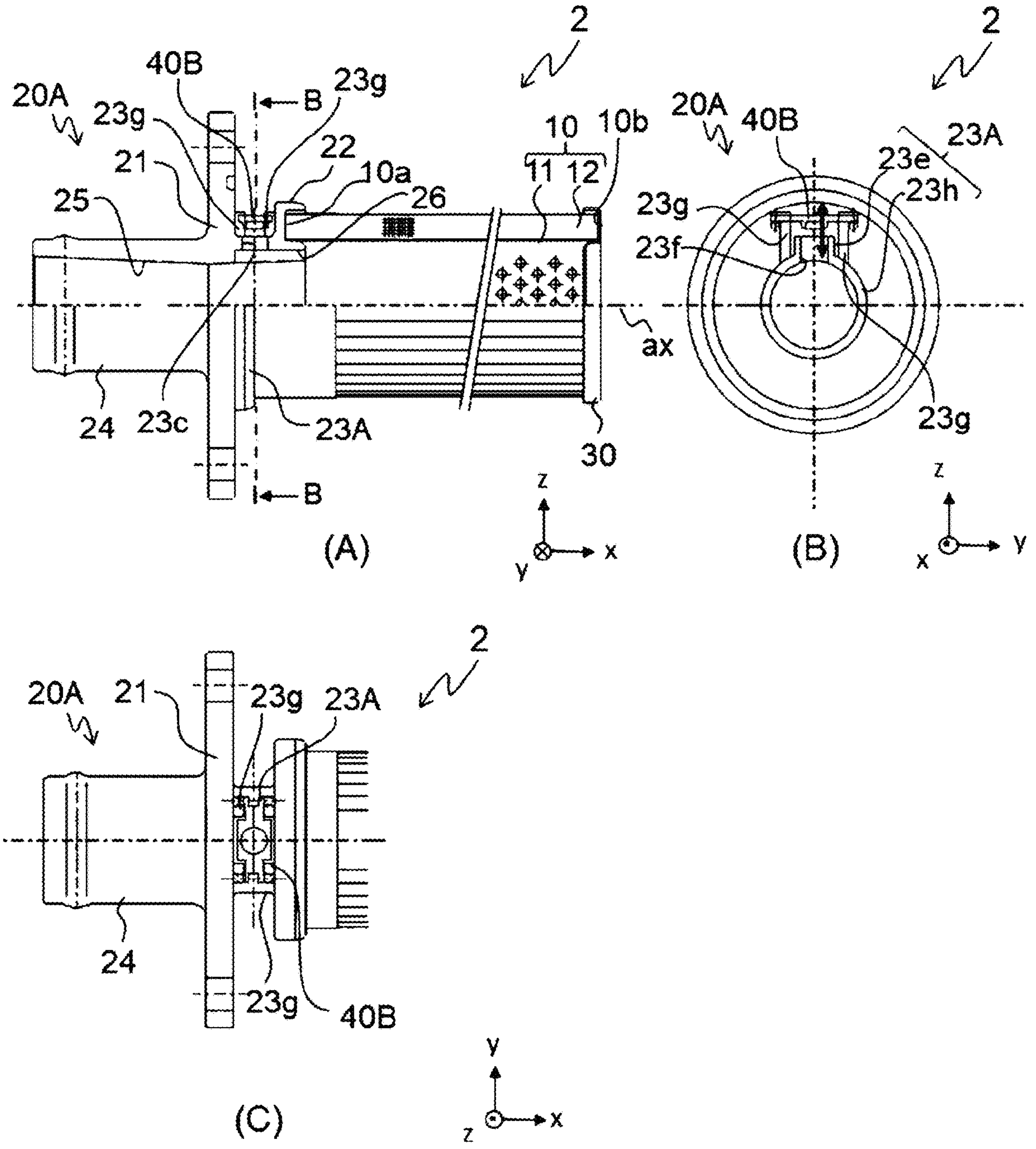
FIG. 8 includes diagrams illustrating an outline of a suction strainer 2. (A) is a front view, (B) is a cross-sectional view taken along B-B of (A), and (C) is a plan view.

FIG. 8 includes diagrams illustrating an outline of a suction strainer 2, FIG. 8(A) is a front view (an upper half portion is illustrated in cross section), FIG. 8(B) is a cross-sectional view taken along B-B of FIG. 8(A), and FIG. 8(C) is a plan view (only main portions are illustrated). In FIG. 8(A), the upper half portion is illustrated in cross section. In FIG. 8, hatching for indicating a cross section is omitted.

The suction strainer 2 mainly includes a filtration section 10, plates 20A and 30, and a float 40B.

The plate 20A (equivalent to the first end member of the present invention) mainly includes the mounting portion 21, the mounting portion 22, a tubular portion 23A having a tubular shape provided between the mounting portion 21 and the mounting portion 22, the mounting tube 24, the hole 25, and a recessed portion 26.

The tubular portion 23A includes a tubular portion 23*h* having a smaller diameter than that of the mounting portion 22 and a protruding portion 23*e* protruding upward (+z direction) from the tubular portion 23*h*. An air vent hole 23*f* is provided in the tubular portion 23*h* and the protruding portion 23*e*. The air vent hole 23*f* is provided at an upper end of the tubular portion 23A in the vertical direction and has one end opening to the hole 25 and the other end opening to the inside of the tank 100. Therefore, air accumulated in the vicinity of the upper end of the hole 25 can be discharged to the outside of the suction strainer 2 through the air vent hole 23*f*.

The hole 25 has the recessed portion 26 communicating with the hollow portion of the filtration section 10. The air accumulated in the hollow portion of the filtration section 10 is easily guided to the air vent hole 23*f* by the recessed portion 26.

The plate 20A has a pair of projections 23*g* provided adjacent to an outer peripheral surface of the tubular portion 23*h*. The float 40B is provided on the projection 23*g*. The float 40B has a substantially lateral U-shape.

Figure 9:
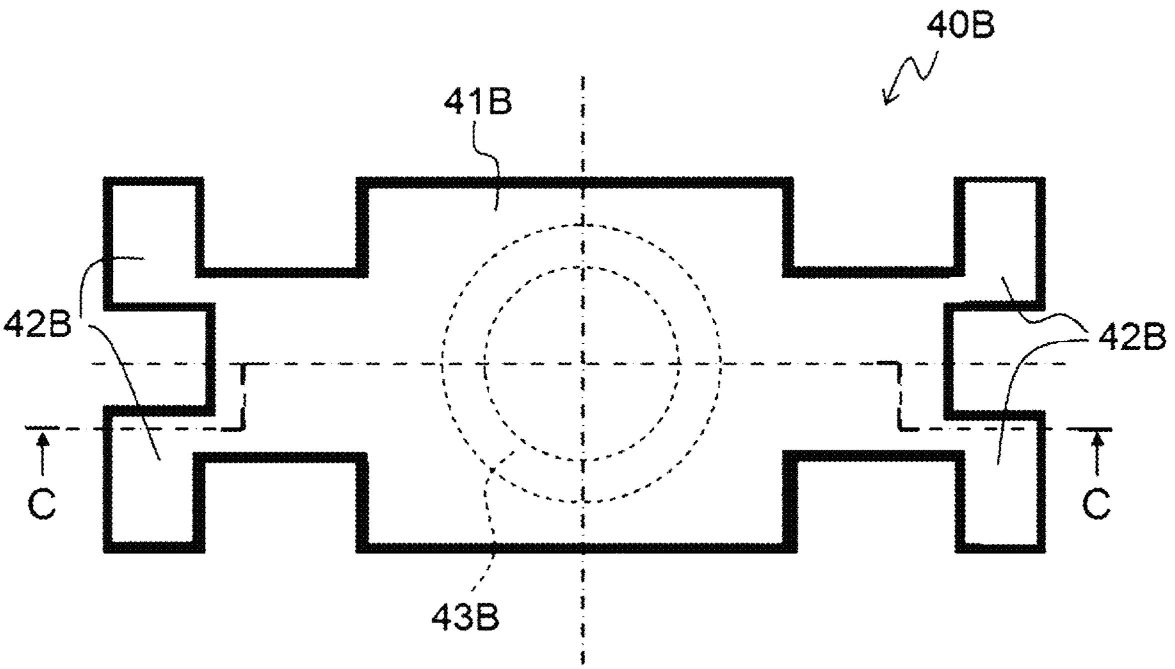
FIG. 9 includes diagrams illustrating an outline of a float 40B. (A) is a plan view, and (B) is a cross-sectional view taken along C-C of (A).
Figure 9:
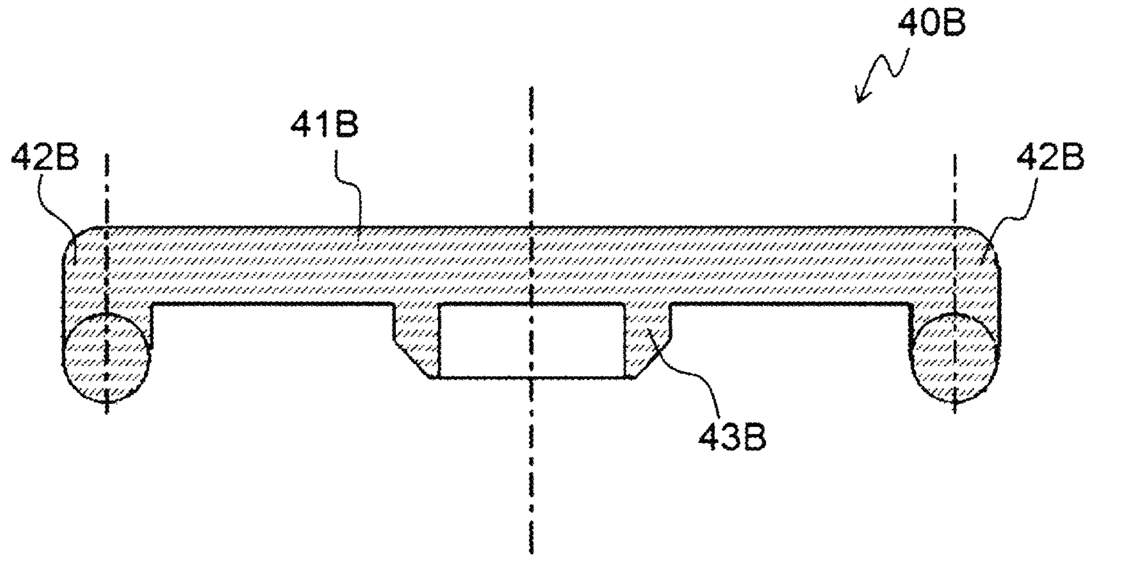

FIG. 9 includes diagrams illustrating an outline of the float 40B, FIG. 9(A) is a plan view, and FIG. 9(B) is a cross-sectional view taken along C-C of FIG. 9(A). The float 40B includes a body portion 41B, leg portions 42B, and an insertion portion 43B. A rod-shaped insertion portion 43B is provided on a surface at the −z side of the body portion 41B. The two leg portions 42B are provided at each of both ends of the body portion 41B.

The description will now return to FIG. 8. The leg portion 42B is provided on the projection 23*g* and the leg portion 42B is movable along the projection 23*g* in the z direction. As a result, the float 40B is movable in the vertical direction (z direction) between a position where the body portion 41B closes the air vent hole 23*f* and a position where the air vent hole 23*f* is opened. When the body portion 41B closes the air vent hole 23*f*, the insertion portion 43B is inserted into the air vent hole 23*f*.

While the hydraulic oil is suctioned by the hydraulic pump, the float 40B is pulled in the −z direction together with the hydraulic oil, the float 40B abuts on the tubular portion 23A, and the body portion 41B closes the air vent hole 23*f*. As a result, the hydraulic oil does not flow into the suction strainer 2 from other than the filtration section 10.

When the hydraulic oil is sucked into the filtration section 10, the air bubbles contained in the hydraulic oil are sucked into the filtration section 10 along with the hydraulic oil. The air bubbles hang together inside the filtration section 10 and the hole 25 and grow into the large air bubbles. The grown air bubbles push up the float 40B in the +z direction to open the air vent hole 23*f*. As a result, the air bubbles are discharged from the air vent hole 23*f* to the outside of the suction strainer 2.

According to the present embodiment, when the suction strainer 2 is provided along the horizontal direction, the air bubbles accumulated inside the suction strainer 2 can be discharged from the suction strainer 2 through the air vent hole 23*f*. In particular, in a state in which the float 40B closes the air vent hole 23*f*, the float 40B and the upper end of the filtration section 10 (pleated filtration member 12) are positioned at substantially the same height. Therefore, the air accumulated inside the filtration section 10 and the hole 25 can be effectively discharged to the outside of the suction strainer 2.

In the present embodiment, the float 40B is formed in the substantially lateral U-shape by extending the leg portions 42B in the z direction, but the shape of the float 40B is not limited thereto. For example, the float may have a plate shape (leg portions 42B do not extend in the z direction).

In the present embodiment, the float 40B and the upper end of the pleated filtration member 12 are positioned at substantially the same height in a state in which the float 40B closes the air vent hole 23*f*, but the float 40B may be higher than the upper end of the pleated filtration member 12. Even in this case, it is possible to effectively discharge the air accumulated inside the filtration section 10 and the hole 25 to the outside of the suction strainer 2.

Third Embodiment

In the first and second embodiments of the present invention, the floats 40, 40A, and 40B are provided outside the tubular portions 23 and 23A, but the configuration of the float is not limited thereto. The third embodiment of the present invention is a configuration in which a float is inserted into an air vent hole. A suction strainer 3 according to the third embodiment will be described below. Note that the same components as those in the first embodiment are denoted by the same reference numerals, and descriptions thereof will be omitted.

Figure 10:
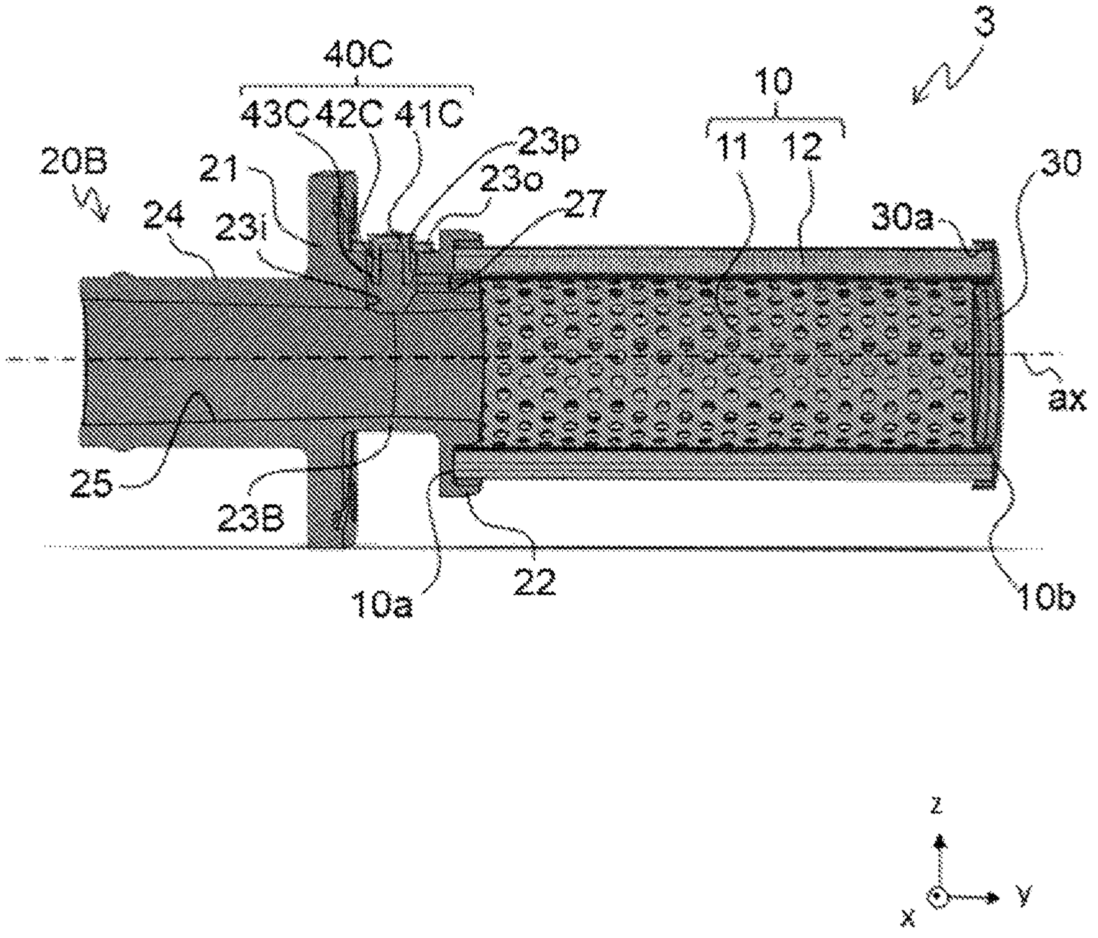
FIG. 10 is a cross-sectional view illustrating an outline of a suction strainer 3.
Figure 11:
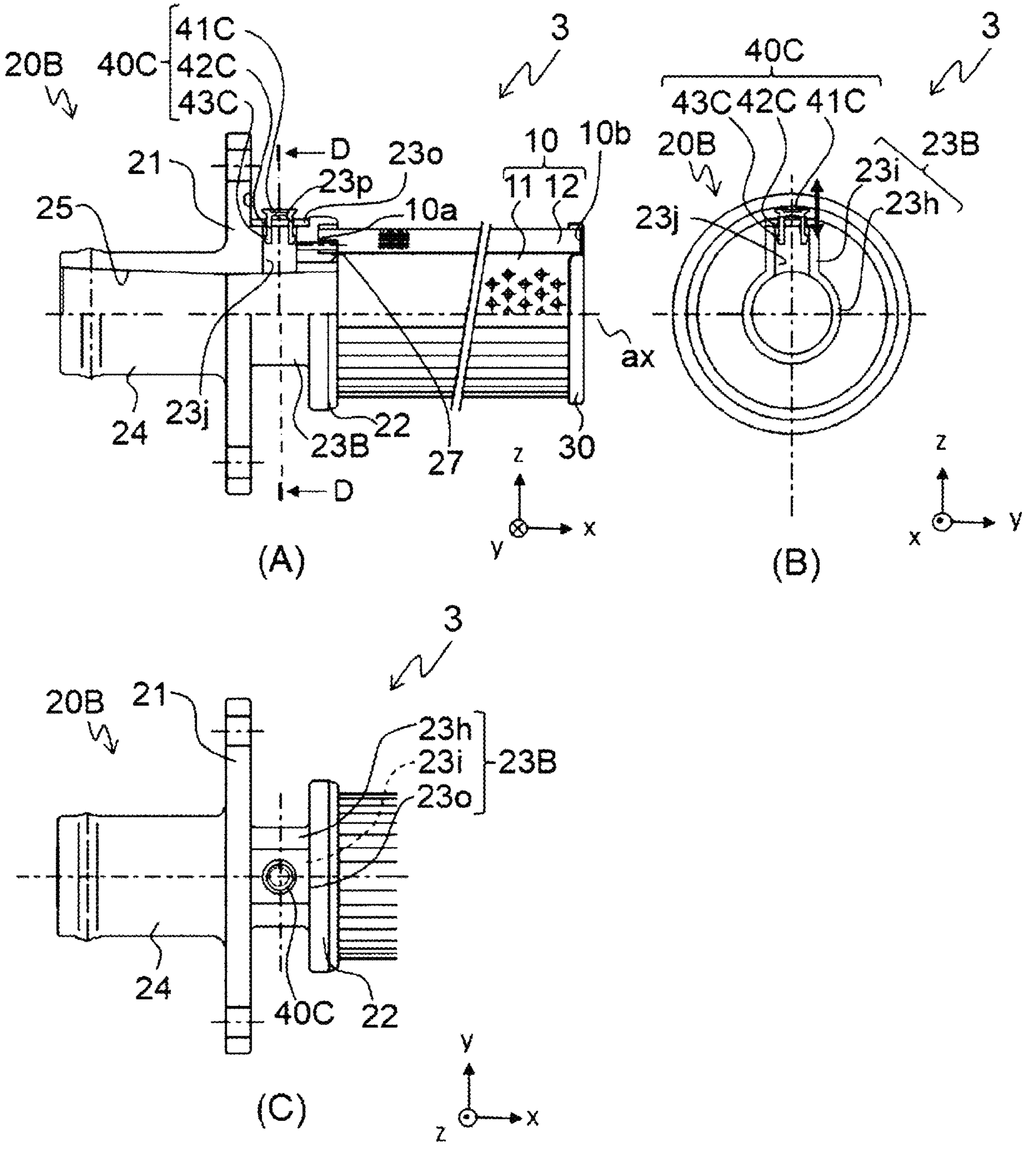
FIG. 11 includes diagrams illustrating an outline of the suction strainer 3. (A) is a front view, (B) is a cross-sectional view taken along D-D of (A), and (C) is a plan view.

FIG. 10 is a cross-sectional view illustrating an outline of the suction strainer 3. FIG. 11 includes diagrams illustrating an outline of the suction strainer 3, FIG. 11(A) is a front view (an upper half portion is illustrated in cross section), FIG. 11(B) is a cross-sectional view taken along D-D of FIG. 11(A), and FIG. 11(C) is a plan view (only main portions are illustrated). In FIG. 11(A), the upper half portion is illustrated in cross section. In FIG. 11, hatching for indicating a cross section is omitted.

The suction strainer 3 mainly includes the filtration section 10, plates 20B and 30, and a float 40C.

The plate 20B (equivalent to the first end member of the present invention) mainly includes the mounting portion 21, the mounting portion 22, a tubular portion 23B having a tubular shape provided between the mounting portion 21 and the mounting portion 22, the mounting tube 24, the hole 25, and a hole 27.

The tubular portion 23B includes the tubular portion 23*h* having a smaller diameter than that of the mounting portion 22 and a protruding portion 23*i* protruding upward (+z direction) from the tubular portion 23*h*. An air vent hole 23*j* is provided in the tubular portion 23*h* and the protruding portion 23*i*. The air vent hole 23*j* is provided at an upper end of the tubular portion 23B in the vertical direction and has one end opening to the hole 25 and the other end opening to the inside of the tank 100.

The plate 20B has the hole 27 (equivalent to a second hole of the present invention) extending parallel to the axis ax. The hole 27 communicates the internal space of the filtration section 10 with the air vent hole 23*j*. As a result, the air bubbles accumulated in the vicinity of the upper end of the hollow portion of the filtration section 10 flow out to the air vent hole 23*j* through the hole 27.

The tubular portion 23B includes a plate-like member 23*o* so as to cover the air vent hole 23*j*. The plate-like member 23*o* has a hole 23*p*. In a plan view, the air vent hole 23*j* overlaps with the hole 23*p*. Therefore, the air accumulated in the vicinity of the upper end of the hole 25 can be discharged to the outside of the suction strainer 3 through the air vent hole 23*j* and the hole 23*p* (equivalent to an air vent hole of the present invention).

The float 40C is provided on the air vent hole 23*j* and the hole 23*p*. The float 40C includes a body portion 41C and leg portions 42C. The leg portions 42C are provided on a surface of the body portion 41C on the −z side. Claws 43C are provided at the distal ends of the leg portions 42C. The leg portion 42C and the claw 43C are inserted into the air vent hole 23*j* and the hole 23*p*.

In a plan view (when viewed from the z direction), a diameter of the hole 23*p* is smaller than a diameter of the air vent hole 23*j*, and a diameter of the body portion 41C is larger than the diameter of the hole 23*p*. Further, in a plan view, a distance between outsides of the two leg portions 42C is smaller than the diameter of the hole 23*p*, and a distance between the two claws 43C is larger than the diameter of the hole 23*p*. Since the leg portions 42C easily deform, the leg portions 42C are deformed to insert the claws 43C into the hole 23*p* to mount the float 40C to the plate-like member 230, and the plate-like member 23*o* and the float 40C are mounted to the protruding portion 23*i*.

When the leg portion 42C and the claw 43C move in the z direction along the air vent hole 23*j*, the float 40C is movable in the z direction between a position where the body portion 41C closes the hole 23*p* and the air vent hole 23*j* and a position where the hole 23*p* and the air vent hole 23*j* are opened.

While the hydraulic oil is suctioned by the hydraulic pump, the float 40C is pulled in the −z direction together with the hydraulic oil, and the float 40C closes the hole 23*p* and the air vent hole 23*j*. As a result, the hydraulic oil does not flow into the suction strainer 3 from other than the filtration section 10.

The air bubbles suctioned into the filtration section 10 together with the hydraulic oil hang together in the filtration section 10 and the hole 25 to grow into large air bubbles, and flow into the air vent hole 23*j*. Further, the air bubbles grown in the vicinity of the upper end of the hollow portion of the filtration section 10 flow into the air vent hole 23*j* through the hole 27. The air bubbles accumulated inside the air vent hole 23*j* push up the float 40C in the +z direction to open the hole 23*p* and the air vent hole 23*j*. As a result, the air bubbles are discharged from the air vent hole 23*j* and the hole 23*p* to the outside of the suction strainer 3.

According to the present embodiment, when the suction strainer 3 is provided along the horizontal direction, the air bubbles accumulated inside the suction strainer 3 can be discharged from the suction strainer 3 through the hole 23*p* and the air vent hole 23*j*. Further, by providing the hole 27, the air bubbles accumulated in the vicinity of the upper end of the hollow portion of the filtration section 10 can be caused to flow out from the hole 27 to the air vent hole 23*j*, and the air bubbles can be efficiently discharged from the suction strainer 3. Further, since the float 40C is higher than the upper end of the filtration section 10 in a state where the float 40C closes the hole 23*p* and the air vent hole 23*j*, air can be effectively discharged to the outside of the suction strainer 3.

In the present embodiment, the hole 27 is a round hole provided along the x direction (parallel to the axis ax), but the shape and position of the hole 27 are not limited thereto. For example, the hole 27 may be inclined with respect to the x direction.

Fourth Embodiment

In the first and second embodiments of the present invention, the filtration section 10 has one pleated filtration member 12, but the number of pleated filtration members is not limited to one. The fourth embodiment of the present invention is a configuration in which a filtration section includes a plurality of pleated filtration members. Below, description will be given of a suction strainer 4 according to the fourth embodiment. Note that the same components as those in the first embodiment are denoted by the same reference numerals, and descriptions thereof will be omitted.

Figure 12:
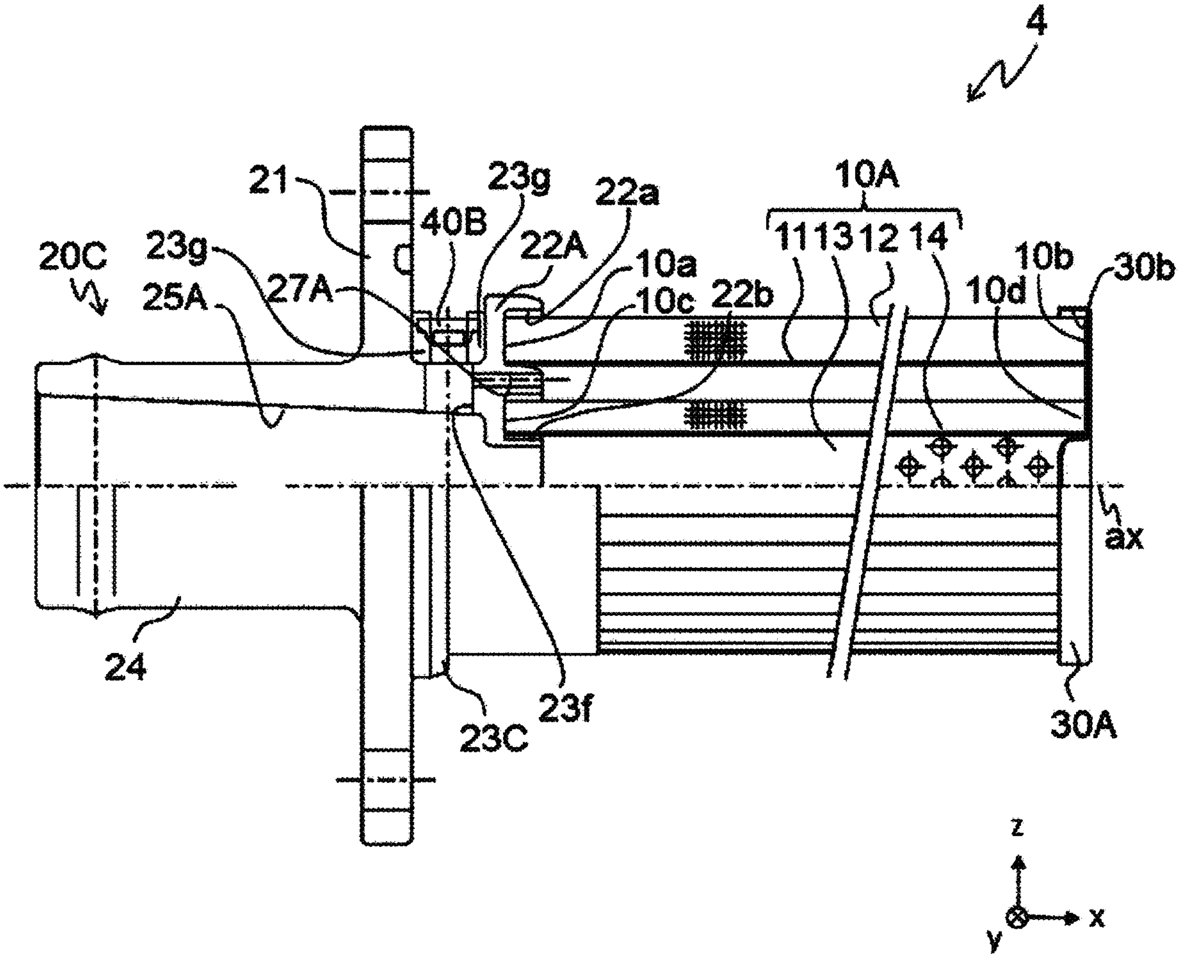
FIG. 12 is a front view illustrating an outline of a suction strainer 4.

FIG. 12 is a front view illustrating an outline of the suction strainer 4. In FIG. 12, the upper half portion is illustrated in cross section, and hatching for indicating the cross section is omitted. The suction strainer 4 mainly includes a filtration section 10A, plates 20C and 30A, and the float 40B.

The filtration section 10A mainly includes inner tubes 11 and 13 and pleated filtration member 12 and 14. The pleated filtration member 14 (equivalent to a second filtration section of the present invention) is formed by pleating a sheet-like thin plate having holes formed in substantially the entire region thereof, and connecting both ends of the pleated thin plate so as to round to form a cylindrical shape, similarly to the pleated filtration member 12 (equivalent to a first filtration section of the present invention). Note that while the pleated filtration member 14 is formed of a wire mesh made of a fine metal (stainless steel, for example) and formed of thin wires woven into a mesh in the present embodiment, a filter paper using, for example, a synthetic resin and a paper may be used.

A height of the pleated filtration member 14 is substantially the same as a height of the inner tube 11 and the pleated filtration member 12. A diameter of the pleated filtration member 14 is smaller than the diameter of the pleated filtration member 12, and the pleated filtration member 14 is provided inside the pleated filtration member 12.

The inner tube 13 is a member having a tubular shape (here, a cylindrical shape) having openings on both ends, and is formed by using a material having high corrosion resistance (for example, stainless steel), similarly to the inner tube 11. The inner tube 13 has holes through which hydraulic oil passes in a substantially its entire region. A diameter of the inner tube 13 is smaller than the diameter of the pleated filtration member 14, and the inner tube 13 is provided inside the pleated filtration member 14.

The plate 20C (equivalent to the first end member of the invention) mainly includes the mounting portion 21, a mounting portion 22A, a tubular portion 23C having a tubular shape provided between the mounting portion 21 and the mounting portion 22A, the mounting tube 24, a hole 25A (equivalent to the first hole of the invention), and a hole 27A (equivalent to a third hole of the invention).

The mounting portion 22A has the recessed portion 22*a* into which the inner tube 11 and the end 10*a* of the pleated filtration member 12 are inserted and a recessed portion 22*b* into which the inner tube 13 and an end 10*c* of the pleated filtration member 14 are inserted. The hole 25A opens in an end surface of the mounting portion 22A. The hole 25A opens to the mounting tube 24. Thus, the hole 25A communicates the hollow portion of the filtration section 10A with the outside of the tank 100. The float 40B is provided on the tubular portion 23C.

The plate 20C has the hole 27A extending parallel to the axis ax. The hole 27A communicates a space inside the inner tube 11 and the pleated filtration member 12 and outside the inner tube 13 and the pleated filtration member 14 with the air vent hole 23*f*. Note that the shape and the position of the hole 27A are not limited thereto, similarly to the hole 27.

Similarly to the plate 30, the plate 30A (equivalent to the second end member of the present invention) is formed using a material (resin or metal) having high corrosion resistance. The plate 30A has a recessed portion 30*b* into which the inner tube 11 and the end 10*b* of the pleated filtration member 12 and the inner tube 13 and the end 10*d* of the pleated filtration member 14 are inserted. The plate 30A is provided so as to cover the end (opening) of the filtration section 10A.

When the hydraulic oil stored in the tank 100 is suctioned by the hydraulic pump (not illustrated), the hydraulic oil passes through the inner tube 11 and the pleated filtration member 12, the inner tube 13, and the pleated filtration member 14 in this order from the outside of the filtration section 10A, is suctioned into the filtration section 10A, and flows out to the suction pipe 101 through the hole 25.

When the hydraulic oil is suctioned into the filtration section 10A, the air bubbles contained in the hydraulic oil are suctioned into the filtration section 10A along with the hydraulic oil. Since the pleated filtration members 12 and 14 are double, the air bubbles are likely to be accumulated between the pleated filtration member 12 and the pleated filtration member 14. The air bubbles accumulated between the pleated filtration member 12 and the pleated filtration member 14 flow out to the air vent hole 23*f* through the hole 27. The air bubbles that have passed through the inner tube 13 and the pleated filtration member 14 flow out from the filtration section 10A to the air vent hole 23*f* through the hole 25A.

The air bubbles that have flowed out to the air vent hole 23*f* hang together inside to grow into the large air bubbles, and push up the float 40B in the +z direction to open the air vent hole 23*f*. As a result, the air bubbles are discharged from the air vent hole 23*f* to the outside of the suction strainer 4.

According to the present embodiment, when the suction strainer 4 is provided along the horizontal direction, the air bubbles accumulated inside the suction strainer 4 can be discharged from the suction strainer 4 through the air vent hole 23*f*. The air bubbles can be efficiently discharged from the suction strainer 4 by doubling the pleated filtration members 12 and 14, accumulating the air bubbles between the pleated filtration member 12 and the pleated filtration member 14, and discharging the air bubbles to the air vent hole 23*f* through the hole 27. Further, since the air bubbles accumulate between the pleated filtration member 12 and the pleated filtration member 14 and the air bubbles are less likely to flow into the hole 25, it is possible to prevent the air bubbles from accumulating in the suction pipe 101 and a failure caused by the suction of air by the pump.

Although the suction strainer 4 includes the float 40B in the present embodiment, the suction strainer 4 may include the float 40C instead of the float 40B.

Fifth Embodiment

Although one float 40 is provided in the fourth embodiment of the present invention, the number of floats is not limited thereto. The fifth embodiment of the present invention is a configuration in which a plurality of floats are provided. Below, description will be given of a suction strainer 5 according to the fifth embodiment. Note that the same components as those in the first embodiment are denoted by the same reference numerals, and descriptions thereof will be omitted.

Figure 13:
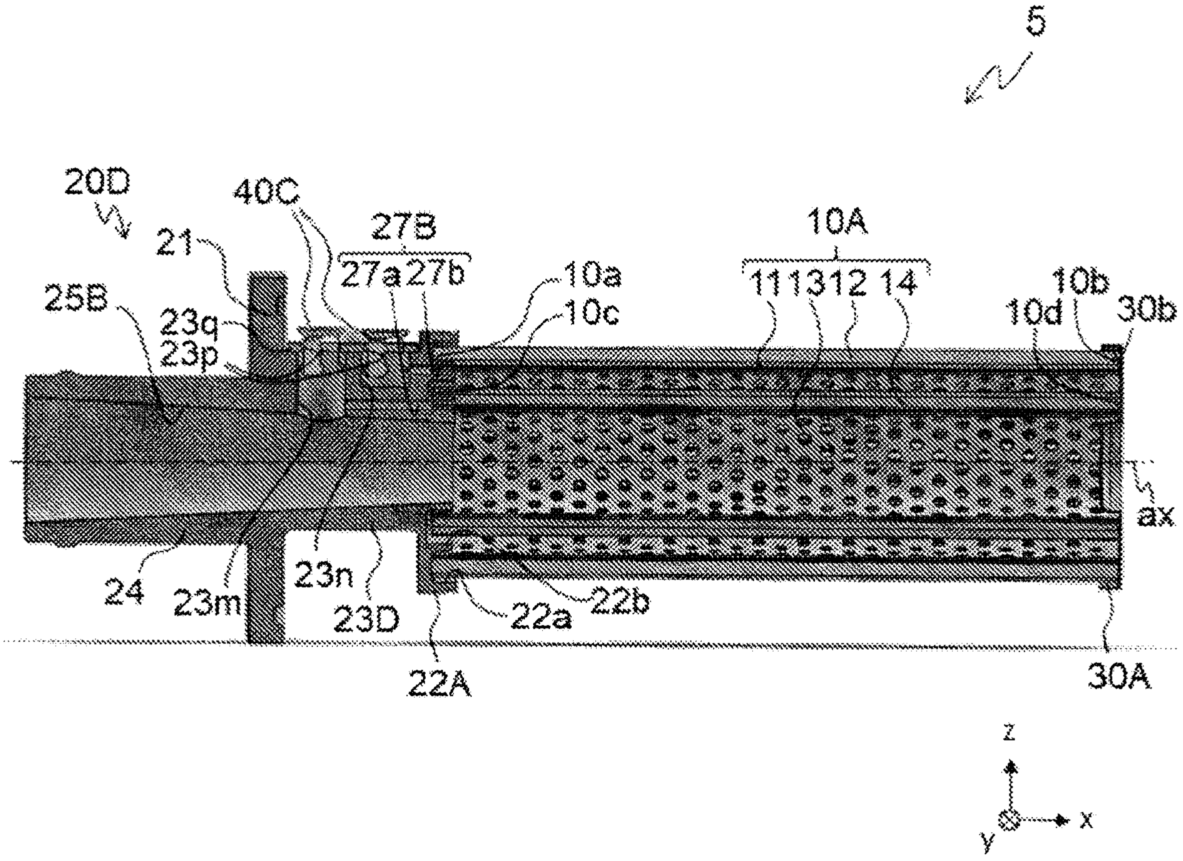
FIG. 13 is a cross-sectional view illustrating an outline of a suction strainer 5.
Figure 14:
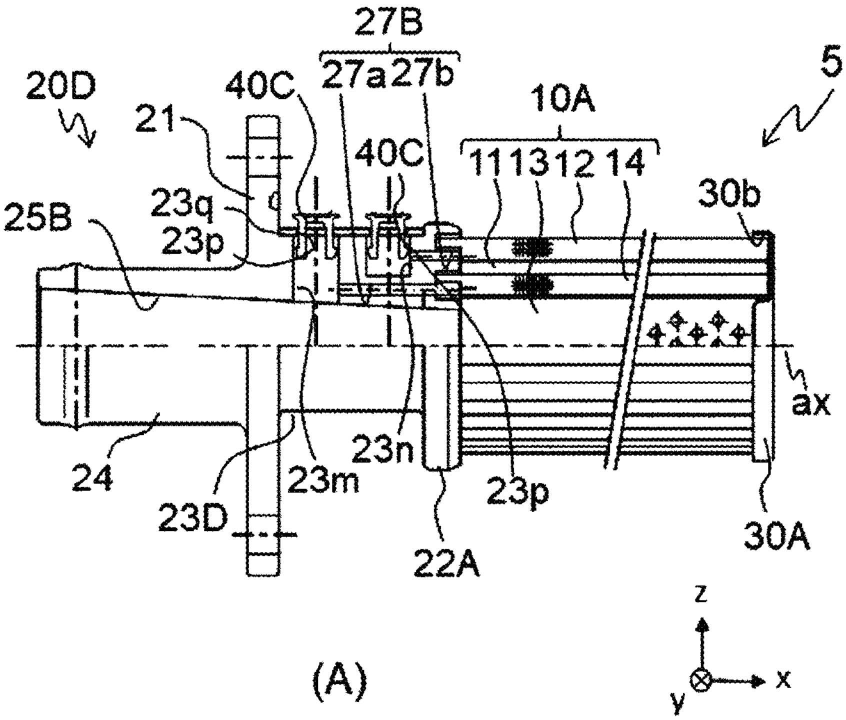
FIG. 14 includes diagrams illustrating an outline of the suction strainer 5. (A) is a front view, and (B) is a plan view.
Figure 14:
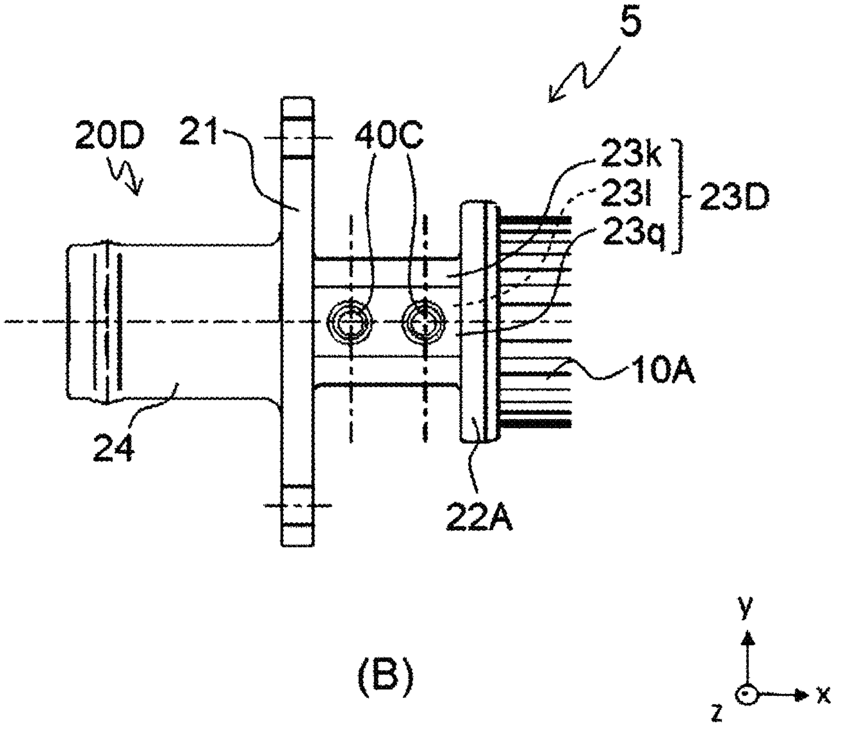

FIG. 13 is a cross-sectional view illustrating an outline of the suction strainer 5. FIG. 14 includes diagrams illustrating an outline of the suction strainer 5, FIG. 14(A) is a front view, and FIG. 14(B) is a plan view. In FIG. 14(A), the upper half portion is illustrated in cross section, and hatching for indicating the cross section is omitted. The suction strainer 5 mainly includes the filtration section 10A, plates 20D and 30A, and the float 40C.

The plate 20D (equivalent to the first end member of the present invention) mainly includes the mounting portion 21, the mounting portion 22A, a tubular portion 23D having a tubular shape provided between the mounting portion 21 and the mounting portion 22A, the mounting tube 24, a hole 25B, and holes 27B.

The tubular portion 23D includes a tubular portion 23*k* having a smaller diameter than that of the mounting portion 22 and a protruding portion 23*l* protruding upward (+z direction) from the tubular portion 23*k*. An air vent hole 23*m* and an air vent recess 23*n* are provided in the tubular portion 23*k* and the protruding portion 23*l*. The air vent hole 23*m* and the air vent recess 23*n* are provided at the upper end of the tubular portion 23D in the vertical direction.

The plate 20D has the holes 27B extending parallel to the axis ax. The holes 27B include a hole 27*a* (equivalent to the second hole of the present invention) communicating the space inside the inner tube 13 and the pleated filtration member 14 with the air vent hole 23*m*, and a hole 27*b* (equivalent to the third hole of the present invention) communicating the space inside the inner tube 11 and the pleated filtration member 12 and outside the inner tube 13 and the pleated filtration member 14 with the air vent recess 23*n*. However, the hole 27*a* is not essential.

One end of the air vent hole 23*m* opens to the hole 25B, and the other end opens to the inside of the tank 100. Therefore, the air bubbles accumulated inside the hole 25B flow out to the air vent hole 23*m*. The air bubbles accumulated in the vicinity of the upper end of the space inside the inner tube 13 and the pleated filtration member 14 flow out to the air vent hole 23*m* through the hole 27*a*.

One end of the air vent recess 23*n* opens to the inside of the tank 100 but does not open to the hole 25B. The air bubbles accumulated in the vicinity of the upper end of the space inside the inner tube 11 and the pleated filtration member 12 and outside the inner tube 13 and the pleated filtration member 14 flow out to the air vent recess 23*n* through the hole 27*b*.

The tubular portion 23D includes a plate-like member 23*q* provided so as to cover the air vent hole 23*m* and the air vent recess 23*n*. The plate-like member 23*q* has the two holes 23*p*. The float 40C is inserted into each of the two holes 23*p*, and the plate-like member 23*q* and the float 40C are mounted to the tubular portion 23*k*. As a result, the float 40C is inserted into the respective air vent hole 23*m* and hole 23*p* (equivalent to the air vent hole of the present invention) and the air vent recess 23*n* and the holes 23*p* (equivalent to the air vent recess of the present invention).

When the leg portions 42C and the claws 43C move in the z direction along the air vent hole 23*m* and the air vent recess 23*n*, the float 40C is movable in the z direction between a position where the body portion 41C closes the air vent hole 23*m*, the air vent recess 23*n*, and the hole 23*p* and a position where the air vent hole 23*m*, the air vent recess 23*n*, and the hole 23*p* open.

While the hydraulic oil is suctioned by the hydraulic pump, the float 40C is pulled in the −z direction together with the hydraulic oil, and the float 40C closes the air vent hole 23*m*, the air vent recess 23*n*, and the hole 23*p*. As a result, the hydraulic oil does not flow into the suction strainer 5 from other than the filtration section 10.

The air bubbles suctioned into the filtration section 10 together with the hydraulic oil hang together inside the filtration section 10A and the hole 25B and grow into the large air bubbles. The air bubbles that have flowed out from the hole 25B and the hole 27*a* to the air vent hole 23*m* push up the float 40B in the +z direction to open the hole 23*p* and the air vent hole 23*m*. As a result, the air bubbles are discharged from the hole 23*p* and the air vent hole 23*m* to the outside of the suction strainer 5.

The air bubbles accumulated between the pleated filtration member 12 and the pleated filtration member 14 flow out to the air vent recess 23*n* through the hole 27*b*, push up the float 40B in the +z direction, and open the hole 23*p* and the air vent recess 23*n*. As a result, the air bubbles are discharged from the hole 23*p* and the air vent recess 23*n* to the outside of the suction strainer 5.

According to the present embodiment, when the suction strainer 5 is provided along the horizontal direction, the air bubbles accumulated inside the suction strainer 5 can be discharged from the suction strainer 5 through the air vent hole 23*m*, the air vent recess 23*n*, and the hole 23*p*. In addition, since the float 40C is higher than the upper end of the filtration section 10A in a state where the float 40C closes the hole 23*p*, the air vent hole 23*m*, and the air vent recess 23*n*, air can be effectively discharged to the outside of the suction strainer 5.

Further, according to the present embodiment, the pleated filtration members 12 and 14 are doubled, the air bubbles are accumulated between the pleated filtration member 12 and the pleated filtration member 14, and the air bubbles are discharged to the air vent recess 23*n* through the hole 27*b*, and therefore the air bubbles can be efficiently discharged from the suction strainer 5. Further, by providing the hole 27*a*, even when the air bubbles are accumulated in the vicinity of the upper end of the space inside the inner tube 13 and the pleated filtration member 14, the air bubbles can be efficiently discharged from the suction strainer 5.

Sixth Embodiment

Although the float 40C inserted into the air vent hole 23*j* is provided in the third embodiment of the present invention, the configuration of the air vent hole 23*j* or the hole 25 is not limited thereto. The sixth embodiment of the present invention has a configuration that includes a recessed portion integrated with the hole 25. Below, description will be given of a suction strainer 6 according to the sixth embodiment. Note that the same components as those in the first and third embodiments are denoted by the same reference numerals, and descriptions thereof will be omitted.

Figure 15:
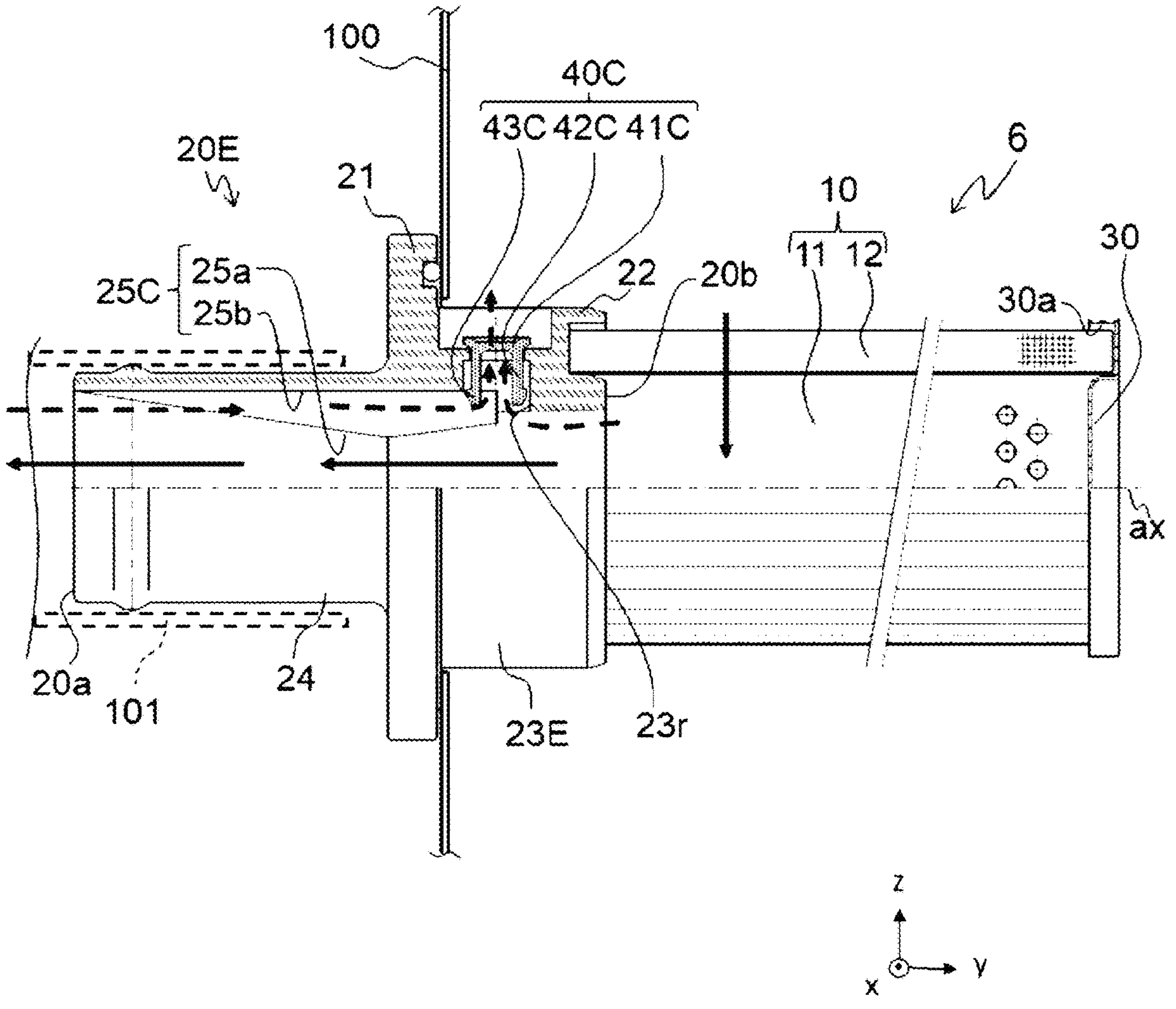
FIG. 15 is a cross-sectional view illustrating an outline of a suction strainer 6.

FIG. 15 is a cross-sectional view illustrating an outline of the suction strainer 6. In FIG. 15, the upper half portion is illustrated in cross section.

The suction strainer 6 mainly includes the filtration section 10, plates 20E and 30, and the float 40C.

The plate 20E (equivalent to the first end member of the present invention) mainly includes the mounting portion 21, the mounting portion 22, a tubular portion 23E having a tubular shape provided between the mounting portion 21 and the mounting portion 22, the mounting tube 24, and a hole 25C.

The tubular portion 23E has an air vent hole 23*r*. The air vent hole 23*r* is provided at an upper end of the tubular portion 23E in the vertical direction. One end of the air vent hole 23*r* is open to the hole 25C, and the other end is open to the inside of the tank 100. The float 40C is provided on the air vent hole 23*r*.

The hole 25C is provided along the horizontal direction. The hole 25C communicates the hollow portion of the filtration section 10 with the outside of the tank 100 (here, the suction pipe 101).

Figure 16:
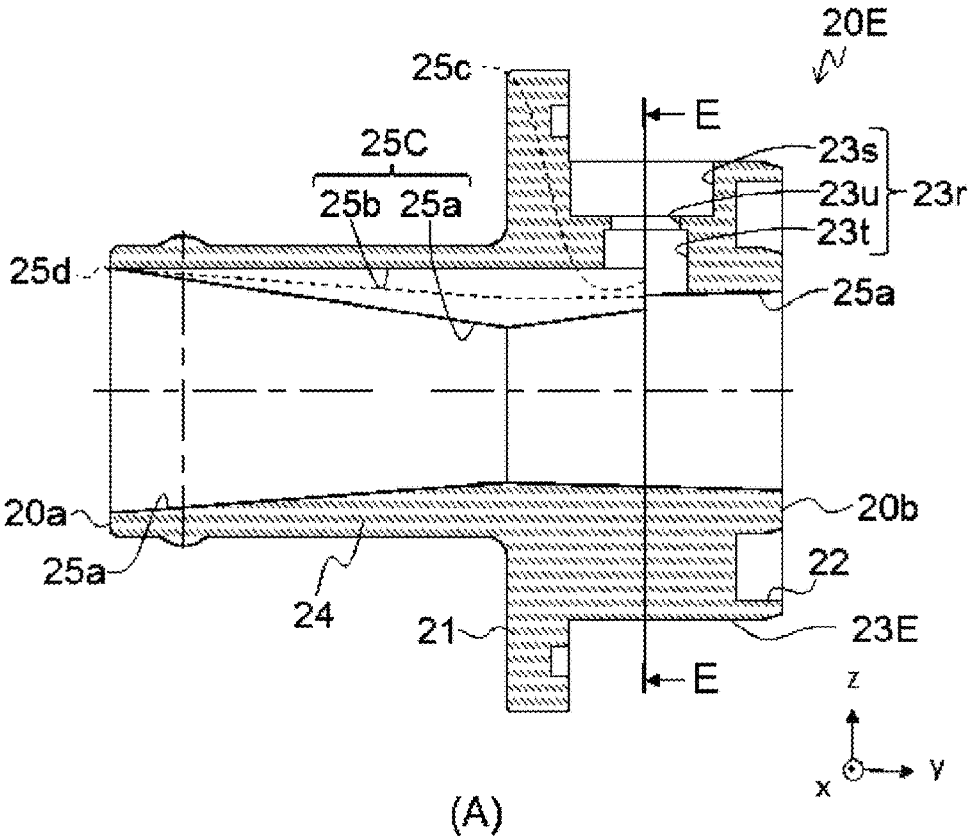
FIG. 16 includes diagrams illustrating an outline of a plate 20E. (A) is a cross-sectional view, and (B) is a cross-sectional view taken along E-E of (A).
Figure 16:
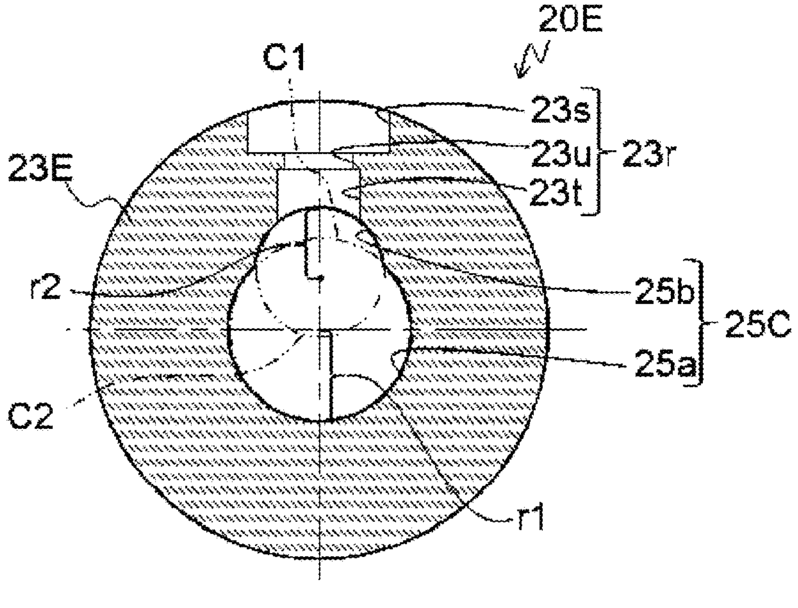

Next, the hole 25C and the air vent hole 23*r* will be described with reference to FIG. 16. FIG. 16 includes diagrams illustrating an outline of a plate 20E, FIG. 16(A) is a cross-sectional view, and FIG. 16(B) is a cross-sectional view taken along E-E of FIG. 16(A).

The air vent hole 23*r* mainly includes recesses 23*s* and 23*t* and a hole 23*u*. The hole 23*u* is provided between the recess 23*s* and the recess 23*t*, and a diameter of the hole 23*u* is smaller than diameters of any of the recesses 23*s* and 23*t*.

A maximum dimension of the leg portion 42B of the float 40C in the horizontal direction is smaller than the diameter of the hole 23*u*, and a maximum dimension between the two claws 43C in the horizontal direction is greater than the diameter of the hole 23*u* (see FIG. 15). Therefore, the float 40C is movable in the z direction between a position where the body portion 41C (see FIG. 15) abuts on a bottom surface of the recess 23*s* to close the air vent hole 23*r* and a position where the claw 43C (see FIG. 15) abuts on a bottom surface of the recess 23*t* to open the air vent hole 23*r*.

The hole 25C mainly includes a through-hole 25*a* and a recessed portion 25*b*. The through-hole 25*a* and the recessed portion 25*b* are integrated. In FIG. 16, a boundary line between the through-hole 25*a* and the recessed portion 25*b* is illustrated by a dotted line. Although an axis of the hole 25C matches the axis ax in the present embodiment, the axis of the hole 25C and the axis ax may be displaced.

As illustrated in FIG. 16(A), one (−y side) end (equivalent to the first end of the present invention) of the through-hole 25*a* opens to an end 20*a* of the plate 20E located outside the tank 100, and the opposite side (+y side) end (equivalent to the second end of the present invention) opens to an end 20*b* of the plate 20E on the side where the filtration section 10 is provided. The through-hole 25*a* has an inverted tapered shape in which respective inner diameters at both ends widen, but the shape of the through-hole 25*a* is not limited thereto.

The recessed portion 25*b* is provided on the downstream side (suction pipe 101 side) of the air vent hole 23*r*. One end 25*c* (equivalent to the third end of the present invention) of the recessed portion 25*b* is located in the air vent hole 23*r*, and an end 25*d* (equivalent to the third end of the present invention) of the recessed portion 25*b* opens to the end 20*a*.

The recessed portion 25*b* is provided so as to cut out a part of an upper peripheral surface of the through-hole 25*a* in the vertical direction, and widens an opening area of the hole 25C in a surface orthogonal to the axis ax. Further, the recessed portion 25*b* is provided substantially parallel to the center axis (here, the axis ax) of the through-hole 25*a*.

The recessed portion 25*b* need not be substantially parallel to the axis ax. For example, the recessed portion 25*b* may be inclined with respect to the axis ax such that the upper end of the recessed portion 25*b* moves to the +z side as approaching the air vent hole 23*r* (as moving to the +y side).

As illustrated in FIG. 16(B), the recessed portion 25*b* has an arcuate shape in a surface orthogonal to the axis ax. The recessed portion 25*b* is curved such that the arc is convex to the upper side in the vertical direction. Although the recessed portion 25*b* may have a shape curved to be convex to the upper side in the vertical direction or a rectangular shape, the recessed portion 25*b* in the present embodiment will be described as having a partial shape of a circle. A radius r1 of the arcuate shape constituting the recessed portion 25*b* is smaller than a radius r2 of the through-hole 25*a*. A circle C2 including the recessed portion 25*b* overlaps with a circle C1 including the through-hole 25*a*. That is, the through-hole 25*a* and the recessed portion 25*b* are integrated. Thus, the recessed portion 25*b* widens the cross-sectional area of the hole 25C in a surface orthogonal to the axis ax.

Note that the through-hole 25*a* has an inverted tapered shape in which respective inner diameters at both ends widen, and although the radius of the circle C1 differs depending on the position, the circle C1 overlaps with the circle C2 regardless of the position of the cross-section, and the radius of the circle C2 is smaller than the radius of the circle C1.

In FIG. 15, solid arrows indicate a flow of hydraulic oil and dashed arrows indicate a flow of air. The air bubbles suctioned into the filtration section 10 together with the hydraulic oil flow from the end 20*b* into the through-hole 25*a*, and then flow into the air vent hole 23*r*. The air bubbles accumulated inside the air vent hole 23*r* push up the float 40C in the +z direction to open the air vent hole 23*r*. As a result, the air bubbles are discharged from the air vent hole 23*r* to the outside of the suction strainer 6.

However, a part of the air bubbles flowing into the air vent hole 23*r* is not completely removed from the air vent hole 23*r* and remains in the hole 25C and the suction pipe 101.

Hereinafter, the residual air bubbles are referred to as residual air. Since the recessed portion 25*b* is provided on the upper side of the through-hole 25*a* in the vertical direction, the residual air in the hole 25C is accumulated in the recessed portion 25*b*.

When the work machine is operated or stopped, the float 40C is lowered in the −z direction, and the air vent hole 23*r* is closed. However, when oil (for example, supplying hydraulic oil to the new tank 100, replacing hydraulic oil in the tank 100, or the like) is supplied, the air in the suction pipe 101 is replaced by the hydraulic oil, whereby the air pushes up the float 40C. As a result, the float 40C moves in the +z direction and the air vent hole 23*r* opens.

When the air vent hole 23*r* opens at the time of oil supply, the residual air accumulated in the recessed portion 25*b* flows into the air vent hole 23*r* and is discharged from the air vent hole 23*r* to the outside of the suction strainer 6. Further, the residual air accumulated in the suction pipe 101 also flows into the recessed portion 25*b* when the air vent hole 23*r* opens at the time of oil supply, and then is discharged to the outside of the suction strainer 6 through the air vent hole 23*r*.

According to the present embodiment, when the suction strainer 6 is provided along the horizontal direction, air bubbles accumulated inside the suction strainer 6 can be discharged from the suction strainer 6 through the air vent hole 23*r*. Further, since the recessed portion 25*b* is provided on the upper side of the through-hole 25*a* in the vertical direction, the residual air accumulated in the recessed portion 25*b* can be discharged from the air vent hole 23*r* to the outside of the suction strainer 6 at the time of oil supply. Therefore, the air can be effectively discharged to the outside of the suction strainer 6.

In the present embodiment, the recessed portion 25*b* has an arcuate shape drawing a circular arc that is convex to the upper side in the vertical direction in the surface orthogonal to the axis ax. However, the shape and position of the hole 27 are not limited thereto. For example, the recessed portion 25*b* may have a rectangular shape in the surface orthogonal to the axis ax. In short, it is only necessary that the through-hole 25*a* and the recessed portion 25*b* are integrated, and the recessed portion 25*b* is provided on the upper side of the through-hole 25*a* in the vertical direction. However, in the surface orthogonal to the axis ax, it is configured such that the recessed portion 25*b* has an arcuate shape, the radius of the arcuate shape is smaller than the radius of the through-hole 25*a*, and the circular arc shape of the arcuate shape is convex to the upper side in the vertical direction. Thus, air bubbles are likely to gather in the vicinity of the upper peripheral surface (upper end in the vertical direction) of the recessed portion 25*b*, and the air accumulated in the recessed portion 25*b* is likely to flow into the air vent hole 23*r*. In addition, by making the radius of the arcuate shape of the recessed portion 25*b* smaller than the radius of the through-hole 25*a*, the upper peripheral surface of the recessed portion 25*b* is narrowed, and the air bubbles accumulated in the recessed portion 25*b* tend to gather and grow into large air bubbles.

Although the recessed portion 25*b* is added to the suction strainer 3 in the present embodiment, the recessed portion 25*b* can be added to the suction strainers 1, 2, 4 and 5.

In the first to fifth embodiments described above, the air vent hole and the air vent recess, which are round holes, are provided in the vicinity of the upper end of the tubular portion. However, the shapes and positions of the air vent hole and the air vent recess are not limited thereto. The air vent hole and the air vent recess only need to be provided at any positions of the tubular portion. For example, the air vent hole and the air vent recess may be provided at the end on the +y side or the −y side of the tubular portion along the horizontal direction. However, since the air bubbles rise inside the hydraulic oil, it is desirable to provide the air vent hole and the air vent recess in the vicinity of the upper end of the tubular portion.

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

Additionally, in the present invention, “substantially” is a concept not only including the case of being strictly the same, but also including an error and deformation to the extent that a loss of identity does not occur. For example, the term “substantially orthogonal” is not limited to the case of being strictly orthogonal, but includes a concept that includes deviations of several degrees, for example. Further, simple expressions such as orthogonal, parallel, and identical are not to be understood as merely being strictly, for example, orthogonal, parallel, and identical, and include being, for example, substantially parallel, substantially orthogonal, and substantially identical.

Additionally, in the present invention, “vicinity” means to include a region in a certain range (the range can be determined arbitrarily) near a reference position. For example, the term “a vicinity of an end” refers to a range of regions in the vicinity of the end, and is a concept indicating that the end may or need not be included.

REFERENCE SIGNS LIST

1, 2, 3, 4, 5, 6: Suction strainer
10, 10A: Filtration section
10*a*, 10*b*, 10*c*, 10*d*: End
11, 13: Inner tube
12, 14: Pleated filtration member
20, 20A, 20B, 20C, 20D, 20E: Plate
20*a*, 20*b*: End
21: Mounting portion
21*a*: Recessed portion
21*b*: Hole
22, 22A: Mounting portion
22*a*, 22*b*: Recessed portion
23, 23A, 23B, 23C, 23D, 23E: Tubular portion
23*a*, 23*b*: Projection
23*c*, 23*f*, 23*j*, 23*m*, 23*r*: Air vent hole
23*d*: Groove
23*e*, 23*i*, 23*l*: Protruding portion
23*g*: Projection
23*h*, 23*k*: Tubular portion
23*n*, 23*q*: Air vent recess
23*o*: Plate-like member
23*p*, 23*u*: Hole
23*s*, 23*t*: Recess
24: Mounting tube
25, 25A, 25B, 25C: Hole
25*a*: Through-hole

25*b*: Recessed portion
25*c*, 25*d*: End
26: Recessed portion
27, 27A, 27B, 27*a*, 27*b*: Hole
30, 30A: Plate
30*a*, 30*b*: Recessed portion
40, 40A, 40B, 40C: Float
41, 41A, 41B, 41C: Body portion
42, 42A, 42B, 42C: Leg portion
43, 43B: Insertion portion
43C: Claw
44: Projection
100 Tank
100*a*: Bottom surface
100*b*: Side surface
100*c*: Outflow port
101: Suction pipe
102: Elastic member
103: Hydraulic pump
110: Hydraulic circuit

The invention claimed is:

1. A suction strainer provided in a tank in which oil is stored, the suction strainer, comprising:

a filtration section having a tubular shape formed by bending a thin plate into a pleated shape;

a first end member and a second end member covering respective both ends of the filtration section; and a float provided on the first end member, wherein the filtration section is provided along a horizontal direction, the first end member includes a plate-shaped first mounting portion provided on a side surface of the tank, a second mounting portion in which the filtration section is provided, a tubular portion having a tubular shape provided between the first mounting portion and the second mounting portion, and a first hole that communicates a hollow portion of the filtration section with an outside of the tank, the tubular portion, the second mounting portion, the filtration section, and the second end member are provided inside the tank, the tubular portion has an air vent hole having one end opening to the first hole and the other end opening to the inside of the tank, and the float is movable between a position where the air vent hole is closed and a position where the air vent hole is opened.

2. The suction strainer according to claim 1, wherein the first end member has a second hole that couples the hollow portion of the filtration section to the air vent hole.

3. The suction strainer according to claim 1, wherein the filtration section includes a first filtration section having a tubular shape and a second filtration section having a tubular shape provided inside the first filtration section, and the first end member has a second hole that couples a hollow portion of the second filtration section to the air vent hole.

4. The suction strainer according to claim 1, wherein the filtration section includes a first filtration section having a tubular shape and a second filtration section having a tubular shape provided inside the first filtration section, and the first end member includes a third hole that couples a space between the first filtration section and the second filtration section to the air vent hole.

5. The suction strainer according to claim 3, wherein the tubular portion has an air vent recess that does not open to the first hole and has one end opening to the inside of the tank, and the first end member includes a third hole that couples a space between the first filtration section and the second filtration section to the air vent recess.

6. The suction strainer according to claim 1, wherein in a state where the float closes the air vent hole, the float and an upper end of the filtration section are located at substantially a same height, or the float is higher than the upper end of the filtration section.

7. The suction strainer according to claim 1, wherein the first hole includes:

a through-hole having a first end as one end opening to an end of the first mounting portion located on the tank side and a second end opposite side of the first end, the second end opening to an end of the first mounting portion on the filtration section side; and a recessed portion provided on an upper side of the through-hole in a vertical direction, the through-hole and the recessed portion are integrated, and a third end as one end of the recessed portion is open to the air vent hole, and a fourth end opposite side of the third end is open to an end of the first mounting portion located outside the tank.

8. The suction strainer according to claim 7, wherein the recessed portion has an arcuate shape drawing an arc that is convex to the upper side in the vertical direction in a surface orthogonal to a center axis of the through-hole.

* * * * *